United States Patent
Osaka et al.

(10) Patent No.: US 8,833,948 B2
(45) Date of Patent: Sep. 16, 2014

(54) MOBILE ELECTRONIC DEVICE

(75) Inventors: Masashi Osaka, Yokohama (JP); Yasuhiro Ueno, Yokohama (JP); Yasushi Kitamura, Yokohama (JP); Seiji Horii, Yokohama (JP); Jouji Yoshikawa, Yokohama (JP); Tomoko Asano, Yokohama (JP); Hiroki Itou, Yokohama (JP); Youji Yamada, Yokohama (JP)

(73) Assignee: Kyocera Corporation, Kyoto (JP)

( * ) Notice: Subject to any disclaimer, the term of this patent is extended or adjusted under 35 U.S.C. 154(b) by 228 days.

(21) Appl. No.: 13/202,638

(22) PCT Filed: Feb. 25, 2010

(86) PCT No.: PCT/JP2010/052931
§ 371 (c)(1),
(2), (4) Date: Aug. 22, 2011

(87) PCT Pub. No.: WO2010/098376
PCT Pub. Date: Sep. 2, 2010

(65) Prior Publication Data
US 2011/0304833 A1    Dec. 15, 2011

(30) Foreign Application Priority Data

Feb. 25, 2009  (JP) ................. 2009-043196
Oct. 23, 2009  (JP) ................. 2009-244025

(51) Int. Cl.
| | |
|---|---|
| G03B 21/14 | (2006.01) |
| H04N 9/74 | (2006.01) |
| G03B 21/20 | (2006.01) |
| H04N 9/31 | (2006.01) |
| H04M 1/02 | (2006.01) |
| G03B 21/00 | (2006.01) |
| H04W 52/02 | (2009.01) |

(52) U.S. Cl.
CPC ............ *G03B 21/00* (2013.01); *G03B 21/2086* (2013.01); *H04N 9/31* (2013.01); *H04N 9/3194* (2013.01); *H04M 1/0202* (2013.01); *H04N 9/3173* (2013.01); *H04M 2250/12* (2013.01); *H04M 1/0272* (2013.01); *H04W 52/0267* (2013.01); *H04M 2250/52* (2013.01); *H04N 9/3129* (2013.01); *H04N 9/3155* (2013.01)
USPC ........................................... 353/97; 348/586

(58) Field of Classification Search
USPC ....................................................... 348/586
See application file for complete search history.

(56) References Cited

U.S. PATENT DOCUMENTS 7,690,797 B2 *   4/2010   Higashi .......................... 353/69
7,896,499 B2     3/2011   Noba
(Continued)

FOREIGN PATENT DOCUMENTS

| JP | 2003-283964 A | 10/2003 |
| JP | 2004-070298 A | 3/2004 |

(Continued)

OTHER PUBLICATIONS

Yamada, Seiji; JP2009-003281; Jan. 8, 2009; Machine Translation in English.*

(Continued)

*Primary Examiner* — William C Dowling
*Assistant Examiner* — Ryan Howard
(74) *Attorney, Agent, or Firm* — Lowe Hauptman & Ham, LLP

(57) ABSTRACT

It is a task to provide a mobile electronic device with high operability and high safety. The mobile electronic device includes an image projector that projects an image, a detector that detects a specific change in an irradiation area of light irradiated from the image projector or in a predetermined area including the irradiation area, and a control unit that controls the operation of the image projector. The task is solved in such a manner that when the detector detects the specific change, the control unit causes the image projector to stop emission of light therefrom, or to reduce an amount of light emitted therefrom.

11 Claims, 15 Drawing Sheets

(56) References Cited

U.S. PATENT DOCUMENTS

| | | | |
|---|---|---|---|
| 7,926,958 | B2 | 4/2011 | Choi et al. |
| 8,382,296 | B2 | 2/2013 | Itoh et al. |
| 2004/0165154 | A1* | 8/2004 | Kobori et al. .............. 353/69 |
| 2005/0046804 | A1 | 3/2005 | Akutsu |
| 2005/0128578 | A1 | 6/2005 | Sugawara et al. |
| 2005/0184958 | A1* | 8/2005 | Gnanamgari et al. ........ 345/157 |
| 2007/0120983 | A1* | 5/2007 | Yamamoto et al. ...... 348/208.99 |
| 2007/0171393 | A1 | 7/2007 | Cho et al. |
| 2008/0055566 | A1 | 3/2008 | Yun |
| 2008/0212041 | A1 | 9/2008 | Koizumi et al. |
| 2009/0036158 | A1 | 2/2009 | Fujinawa et al. |
| 2009/0143098 | A1 | 6/2009 | Shiono |
| 2009/0147224 | A1* | 6/2009 | Kurozuka et al. .............. 353/98 |

FOREIGN PATENT DOCUMENTS

| | | |
|---|---|---|
| JP | 2005-352172 A | 12/2005 |
| JP | 2006-133401 A | 5/2006 |
| JP | 2007-096542 A | 4/2007 |
| JP | 2007-228551 A | 9/2007 |
| JP | 2008-083453 A | 4/2008 |
| JP | 2008-249783 A | 10/2008 |
| JP | 2009-003281 A | 1/2009 |
| WO | WO 2007034875 A1 * | 3/2007 |

OTHER PUBLICATIONS

Yasuda, Hideyuki; JP2007-228551; Sep. 6, 2007; Machine Translation in English.*

International Search Report for PCT/JP2010/052931 mailed Apr. 27, 2010.

International Search Report for PCT/JP2010/052929 mailed Apr. 27, 2010.

Office Action mailed May 28, 2013 corresponds to Japanese patent application No. 2009-244025.

* cited by examiner

FIG.15A

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | NOT SELECTABLE | SELECTABLE |

FIG.15B

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | SELECTABLE | SELECTABLE |

FIG.15C

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | NOT SELECTABLE | SELECTABLE |

FIG.15D

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | SELECTABLE | SELECTABLE |

MOBILE ELECTRONIC DEVICE

CROSS-REFERENCE TO RELATED APPLICATION

This application is a National Stage of International Application No. PCT/JP2010/052931, filed on Feb. 25, 2010 which designates the United States and claims the benefit of priority from Japanese Patent Application No. 2009-43196, filed on Feb. 25, 2009, and Japanese Patent Application No. 2009-244025, filed on Oct. 23, 2009.

TECHNICAL FIELD

The present invention relates to a mobile electronic device including an image projector for projecting an image to a screen or to a wall surface.

BACKGROUND ART

As a conventional device for projecting an image to a wall surface or a screen, a so-called projector is used. A mainstream of the projector is a so-called stationary type device which is supplied with power from a commercial power supply and is used when it is fixed to a predetermined location. A projector as the stationary type projects, in its fixed state, an image to a given portion of the wall surface or to the screen.

Recently, on the other hand, a mobile projector compact in size and easy to carry is proposed as the projector. For example, Patent Literature 1 describes a mobile terminal with a projector function which incorporates a projector that includes an upper cabinet, a lower cabinet, and a hinge portion for mutually pivotally connecting the upper cabinet and the lower cabinet and that has a lens and a light source.

This type of mobile projector can easily change an area to which an image is projected by the projector. That is, the projector can easily change a light irradiation direction. Therefore, the light may be unintentionally irradiated to a person. Because the projector irradiates high-intensity light, if the light irradiated from the projector directly enters person's eyes at a close position, the person is very dazzled by the irradiated light.

In terms of this point, for example, Patent Literature 2 describes a mobile communication terminal with a projection function that includes a projector for projecting projection data, a detector for detecting a state of the mobile communication terminal, a movement determining unit for determining whether there is any change in the state detected by the detector, and a control unit for sending the projection data to the projector. The mobile communication terminal is capable of controlling a light amount when a person enters a projected light area by transmitting control data for controlling a light amount to be projected by the control unit when the movement determining unit determines that there is a change in the state of the terminal.

CITATION LIST

Patent Literature

Patent Literature 1: Japanese Patent Application Laid-open No. 2007-96542
Patent Literature 2: Japanese Patent Application Laid-open No. 2007-228551

DISCLOSURE OF INVENTION

Problem to be Solved by the Invention

As described in Patent Literature 2, when the state of the terminal changes, the amount of light output from the projector is reduced or the output thereof is stopped, so that a possibility that a direct light may enter person's eyes or that the person may be dazzled by the light can be reduced while an operator is operating the terminal.

Even if the state of the terminal is not changed, the light output from the projector may enter person's eyes because surroundings change or the person moves. However, the terminal described in Patent Literature 2 cannot respond to this point because it is not configured to reduce an amount of light to be output or to stop the output if there is no change in the state of the terminal. Therefore, there is a possibility that the terminal described in Patent Literature 2 irradiates a strong light to the person's eyes and causes the person to be dazzled by the light. The terminal described in Patent Literature 2 can be manually interrupted, however, the operation is required. Besides, it is difficult to quickly respond to such an unforeseen case.

It is an object of the present invention to provide a mobile electronic device with high operability and high safety.

SUMMARY OF THE INVENTION

According to an aspect of the present invention, a mobile electronic device includes: an image projector that projects an image; a detector that detects a specific change in an irradiation area of light irradiated from the image projector or in a predetermined area including the irradiation area; and a control unit that controls an operation of the image projector. When the detector detects the specific change, the control unit causes the image projector to stop emission of light therefrom or to reduce an amount of light emitted therefrom.

According to another aspect of the present invention, the detector includes a proximity sensor that measures a distance between an object in the irradiation area or in the predetermined area including the irradiation area and a light emission position of the image projector, and the detector detects a change in the distance to the object measured by the proximity sensor as the specific change.

According to another aspect of the present invention, the detector detects that a change rate of the distance between the object in the irradiation area or in the predetermined area including the irradiation area detected by the proximity sensor and the light emission position of the image projector is a given value or more, as the specific change.

According to another aspect of the present invention, the proximity sensor includes a light-emitting element and a light-receiving element, and measures a distance to the object in such a manner that light emitted from the light-emitting element and reflected by the object is received by the light-receiving element.

According to another aspect of the present invention, the proximity sensor includes a light-receiving element, and measures a distance to the object in such a manner that light irradiated from the image projector and reflected by the object is received by the light-receiving element.

According to another aspect of the present invention, the detector includes an imaging unit that photographs an image in the irradiation area, and an image analyzer that analyzes the image photographed by the imaging unit, and the detector detects that the image analyzer detects a person's face within the irradiation area or within the predetermined area including the irradiation area, as the specific change.

According to another aspect of the present invention, the detector includes an infrared transmitter/receiver that detects concave-convex in the irradiation area or in the predetermined area including the irradiation area, and the detector detects that the infrared transmitter/receiver detects concave-convex, which can be recognized as a person, within the irradiation area or within the predetermined area including the irradiation area, as the specific change.

According to another aspect of the present invention, the detector includes an optical sensor that detects light reflected in the irradiation area, and the detector detects that the optical sensor detects that there is a change in the presence or absence of the object within the irradiation area or within the predetermined area including the irradiation area, as the specific change.

According to another aspect of the present invention, the detector includes a voice detector that detects voice, and the detector detects that the voice detector detects voice that coincides with a preset sound within the irradiation area or within the predetermined area including the irradiation area, as the specific change.

According to another aspect of the present invention, the detector includes a temperature sensor that measures a temperature in the irradiation area or in the predetermined area including the irradiation area, and the detector detects that a person is detected within a given distance from a light emission position of the image projector within the irradiation area based on a result of measurement by the temperature sensor, as the specific change.

According to another aspect of the present invention, the mobile electronic device further includes: a cabinet that holds the image projector and the control unit; and an acceleration sensor that detects an acceleration acting on the cabinet. When a first acceleration value is detected by the acceleration sensor, the control unit sets the number of detections per unit time by the detector to a larger number as compared with a case where a second acceleration value being an acceleration value smaller than the first acceleration value is detected.

According to another aspect of the present invention, the first acceleration value is a detected value of acceleration caused by natural hand vibration when a user holds the cabinet, and the second acceleration value is an acceleration value detected in a stationary state of the cabinet.

According to another aspect of the present invention, the second acceleration value is a detected value of acceleration caused by natural hand vibration when a user holds the cabinet, and the first acceleration value is an acceleration value exceeding the second acceleration value.

According to another aspect of the present invention, the mobile electronic device further includes: a cabinet that holds the image projector and the control unit; and a geomagnetic sensor that detects a change amount of geomagnetism in the cabinet. When a first change amount is detected by the geomagnetic sensor, the control unit sets the number of detections per unit time by the detector to a larger number as compared with a case where a second change amount being a change amount of geomagnetism smaller than the first change amount is detected.

According to another aspect of the present invention, the mobile electronic device further includes: a cabinet that holds the image projector and the control unit; and a touch sensor that detects that a user touches a surface of the cabinet or presses a surface of the cabinet. When the touch sensor detects that the user touches or presses the cabinet, the control unit sets the number of detections per unit time by the detector to a larger number as compared with a case where the touch or pressing is not detected.

Effect of the Invention

The mobile electronic device according to the present invention can perform more appropriate control by controlling the amount of light to be emitted from the image projector based on the result of detection by the detector. Thus, the mobile electronic device according to the present invention achieves such an effect that the operability and the safety can be enhanced.

The mobile electronic device according to the present invention controls a timing of detection by the detector so that power saving can be achieved.

BRIEF DESCRIPTION OF DRAWINGS

FIG. 15A is an explanatory diagram of one example of controls in the mobile electronic device.

FIG. 15B is an explanatory diagram of one example of controls in the mobile electronic device.

FIG. 15C is an explanatory diagram of one example of controls in the mobile electronic device.

FIG. 15D is an explanatory diagram of one example of controls in the mobile electronic device.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, and substantially equivalents or those in an equivalent scope. A mobile phone as a mobile electronic device will be explained hereinafter as an example, however, an applied target of the present invention is not limited to the mobile phone. The present invention can also be applied to, for example, PHS (Personal Handyphone System), PDA, a portable navigation device, a notebook-size personal computer, and a game machine.

Figure 1:
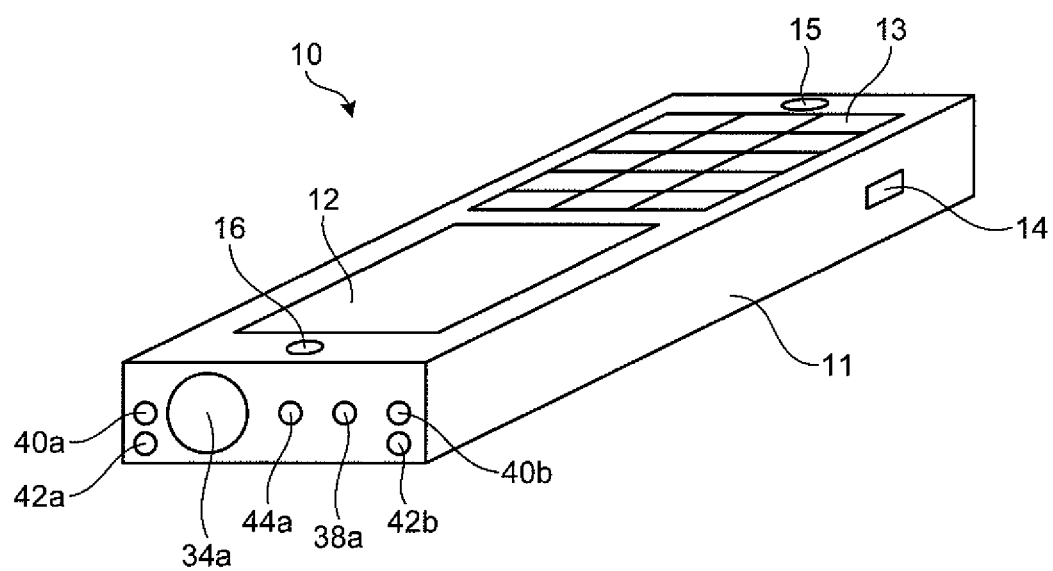
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of the mobile electronic device. A mobile electronic device 10 is a mobile phone provided with a wireless communication function. The mobile electronic device 10 is a straight mobile phone with units stored inside of one box-shaped cabinet 11. In the present invention, the cabinet 11 is formed to a box shape, however, the cabinet may be formed with two members coupled to each other by a hinge and thereby be foldable, or the cabinet may be configured to have two members which are slidable. A cabinet connected with three or more members can also be used.

The cabinet 11 is provided with a display 12 as a display unit illustrated in FIG. 1. The display 12 displays a predetermined image, such as a standby image when the mobile electronic device 10 is in a standby state for waiting for reception and a menu image used to help operation of the mobile electronic device 10.

The cabinet 11 is provided with a plurality of operation keys 13 used to enter a telephone number of an intended party or to enter text when an email is created. In addition, a dedicated key 14 for controlling operations of a projector 34, explained later, is provided in one of sides of the cabinet 11 (one of faces substantially orthogonal to a face where the operation keys 13 are provided). The operation keys 13 and the dedicated key 14 constitute an operating unit of the mobile electronic device 10. The cabinet 11 is also provided with a microphone 15 that receives a voice during talking on the mobile electronic device 10, and with a receiver 16 that emits voice during talking on the mobile electronic device 10.

A light emitting portion 34a of the projector 34 for projecting an image is provided on a top face of the cabinet 11 (one side of the top face meets a face where the operation keys 13 are provided and one side of the other sides meets a face where the dedicated key 14 is provided). Further provided on the top face of the cabinet 11 are an imaging portion 38a of a camera 38, a transmitter 40a and a receiver 40b of a proximity sensor 40, a transmitter 42a and a receiver 42b of an infrared sensor 42, and a light receiver 44a of an optical sensor 44.

Figure 2:
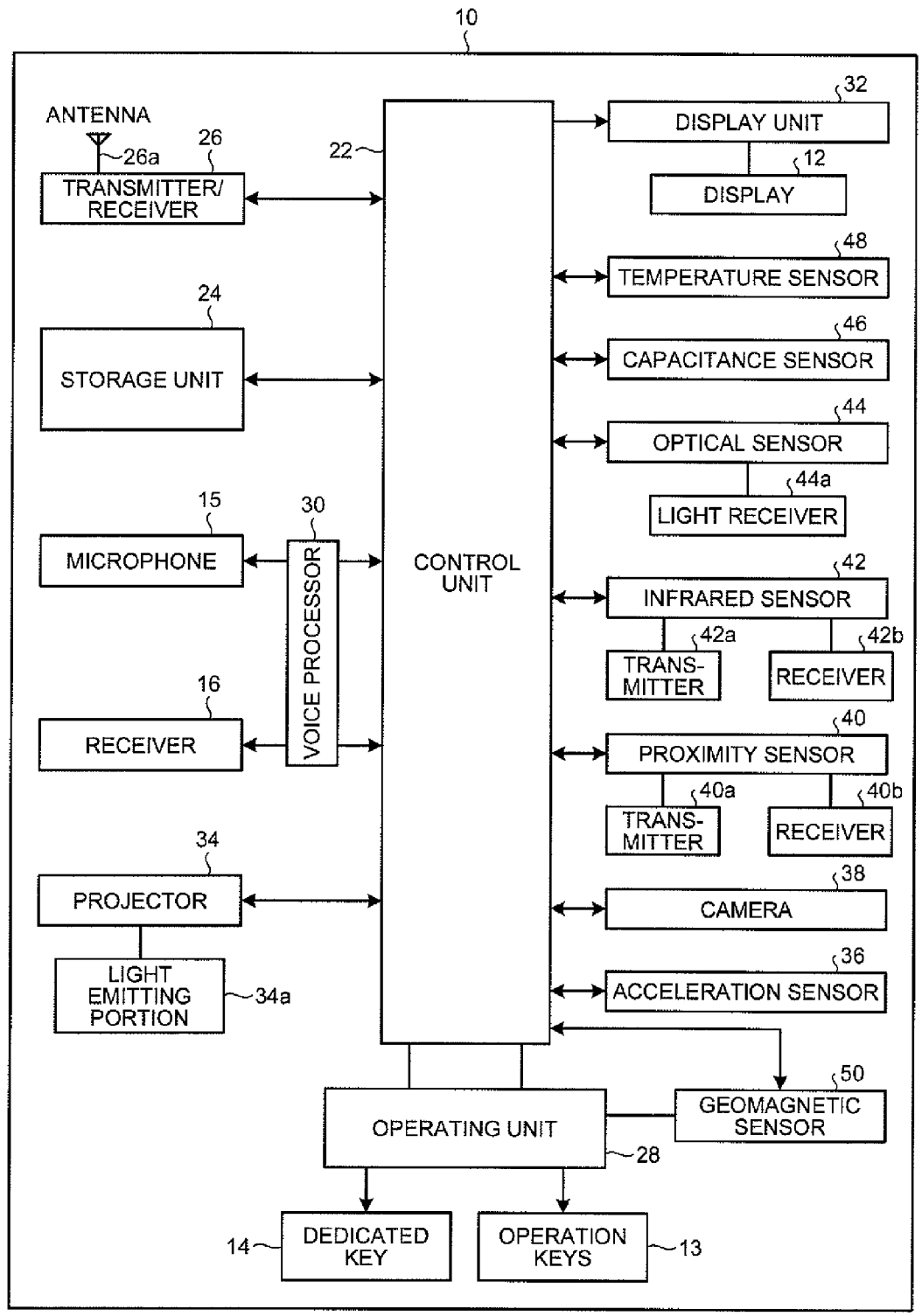
FIG. 2 is a block diagram of the schematic configuration of the mobile electronic device as illustrated in FIG. 1.

FIG. 2 is a block diagram illustrating the schematic configuration of functions of the mobile electronic device as illustrated in FIG. 1. The mobile electronic device 10 as illustrated in FIG. 2 includes a control unit 22, a storage unit 24, a transmitter/receiver 26, an operating unit 28, a voice processor 30, a display unit 32, the projector 34, an acceleration sensor 36, the camera 38, the proximity sensor 40, the infrared sensor 42, the optical sensor 44, a capacitance sensor 46, a temperature sensor 48, and a geomagnetic sensor 50.

The control unit 22 is a processor such as a CPU (central processing unit) that integrally controls an overall operation of the mobile electronic device 10. That is, the control unit 22 controls the operations of the transmitter/receiver 26, the voice processor 30, and the display unit 32 or the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice communication performed through a line switching network, creation and transmission/reception of an electronic mail, and browsing to a Web (World Wide Web) site on the Internet. In addition, the operations of the transmitter/receiver 26, the voice processor 30, and the display unit 32 or the like include signal transmission/reception by the transmitter/receiver 26, voice input/output by the voice processor 30, and display of an image by the display unit 32.

The control unit 22 executes processes based on programs (e.g., operating system program and application programs) stored in the storage unit 24. The control unit 22 is formed with, for example, a MPU (Micro Processing Unit), and executes the various processes of the mobile electronic device 10 according to the sequence instructed by the software. That is, the control unit 22 sequentially loads operation codes from the operating system program and the application programs stored in the storage unit 24, and executes the processes.

The control unit 22 has a function of executing a plurality of application programs. The application program executed by the control unit 22 includes a plurality of application programs such as an application program for controlling the drive of the projector and game application programs for activating various games.

The storage unit 24 stores therein software and data used for processes performed by the control unit 22, a task for activating an application program that controls the drive of the projector and a task for activating various game application programs.

The storage unit 24 stores therein, in addition to these tasks, for example, voice data through communication and downloaded voice data, or software used by the control unit 22 for controlling the storage unit 24, and telephone numbers and email addresses of communication opposite parties, and also stores therein addresses to be managed, a sound file of a dial tone and a ring tone or the like, temporary data used for a process of software. The computer programs and the temporary data used for the processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal line based on CDMA system with a base station through a channel allocated by the base station, and performs telephone communication and information communication with a base station.

The operating unit 28 is formed with the operation keys 13 such as Power key, Talk key, Numeric keys, Character keys, Direction key, OK key, and Send key to which various functions are allocated respectively, and with the dedicated key 14. When these keys are used to enter information through the operation by the user, the operating unit 28 emits a signal corresponding to the content of the operation. The emitted signal is input to the control unit 22 as an instruction of the user.

The voice processor 30 executes processes of a voice signal input to the microphone 15 and a voice signal output from the receiver 16. That is, the voice processor 30 amplifies the voice input through the microphone 15, subjects the voice to AD conversion (Analog to Digital conversion), then further subjects the voice to signal processing such as coding, converts the coded voice to digital voice data, and outputs the digital voice data to the control unit 22. Moreover, the voice processor 30 decodes the digital voice data sent from the control unit 22, subjects the decoded data to DA conversion (Digital to Analog conversion), subjects the converted data to processes such as amplification to be converted to an analog voice signal, and outputs the analog voice signal to the receiver 16.

The display unit 32 is provided with a display panel (such as the display 12) formed with a LCD (Liquid Crystal Display) or an organic EL (Electro-Luminescence) panel or the like, and displays a video image according to video data supplied from the control unit 22 and an image according to image data on the display panel. The display unit 32 may be provided with, for example, a sub-display at a location that is exposed to the outside even when the cabinet is closed, in addition to the display 12.

Figure 3:
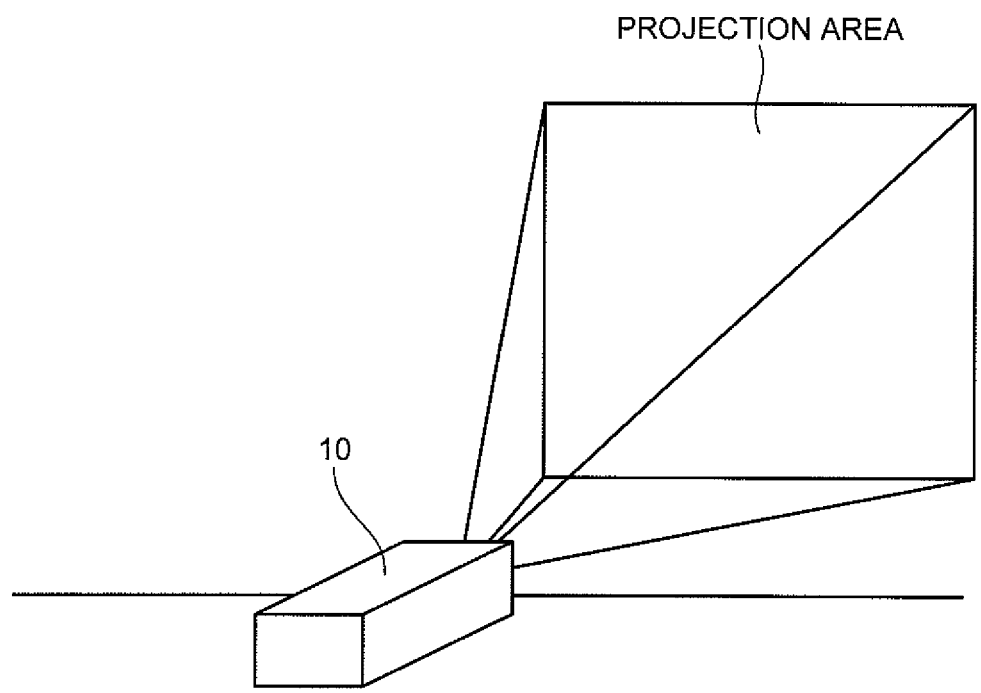
FIG. 3 is an explanatory diagram illustrating a state in which an image is displayed by the mobile electronic device as illustrated in FIG. 1.

The projector 34 is an image projection mechanism for projecting an image, and, as explained above, is provided with the light emitting portion 34a for projecting an image, on the top face of the cabinet 11. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the cabinet 11. The operation of projector 34 is controlled by the control unit 22, so that various video images such as films and presentation materials sent from the control unit 22 are projected and displayed on the projection area.

The projector 34 is formed with a light source and an optical system that switches whether the light emitted from the light source is projected, according to the image data. For example, a projector configured with a halogen light, a LED light source, or an LD light source as the light source and with an LCD (Liquid Crystal Display) or a DMD (Digital Micromirror Device) as the optical system can be used as the projector 34. In this case, the optical system is provided over the whole area of the projection area corresponding to pixels, and the optical system is turned on or off by synchronizing the light emitted from the light source with the image, so that the image can be projected over the whole area of the projection area. A projector configured with a light source that emits laser light, and with an optical system that includes a switching element for switching whether the light emitted from the light source is to be transmitted and a mirror for subjecting the light having passed through the switching element to raster scanning can be used as the projector 34. In this case, by changing an angle of the light emitted from the laser light by the mirror and scanning the light irradiated from the light source over the whole area of the projection area, the image can be projected to the projection area.

The acceleration sensor 36 is a detector that detects an acceleration applied to the cabinet 11. As the acceleration sensor 36, a detector that detects an acceleration using various methods can be used. For example, a detector that detects an acceleration based on a change in capacitance, a change in piezo resistance, or a change in relative positions can be used. The acceleration sensor 36 detects an acceleration acting on the cabinet 11 when the operator shakes or moves the cabinet 11.

The camera 38 is an imaging system in which the imaging portion 38a provided on the top face of the cabinet 11 captures an image in an area including a projection area. That is, the camera 38 captures an image in a direction in which the projector 34 emits light. It should be noted that the camera 38 is an imaging system for photographing an image at an angle of view wider than an angle of view of an image irradiated by the projector 34, and thus can photograph an image in an area wider than a projection area to which an image is projected by the projector 34.

The proximity sensor 40 is a measuring device for measuring a distance to an object (hereinafter, may be referred to as a "target object") in a predetermined direction (direction in which the projector 34 emits light in the present embodiment). The proximity sensor 40 includes the transmitter 40a which is provided on the top face of the cabinet 11 and emits a measurement wave such as an infrared ray, an ultrasonic wave, and a laser light; and the receiver 40b which is provided on the top face of the cabinet 11 and receives the measurement wave. The receiver 40b receives the measurement wave emitted from the transmitter 40a and reflected by the target object. The proximity sensor 40 calculates a distance between the proximity sensor 40 and the target object based on the intensity of the measurement wave received by the receiver 40b, an incident angle of the measurement wave, and a time from transmission of the measurement wave by the transmitter 40a to reception thereof by the receiver 40b. When there is no object between a wall surface or a screen (portion corresponding to the projection area) as a target to which an image is projected and the mobile electronic device 10, the proximity sensor 40 detects a distance to the wall surface or the screen which is regarded as a target object. When there is an object (human, obstacle) between the wall surface or the screen and the mobile electronic device 10, the proximity sensor 40 detects a distance to the object which is regarded as a target object. As for a relationship with the target object to be detected, the same goes for all sensors which will be described hereinafter.

The infrared sensor 42 is a measuring device that measures concave-convex of a target object in a predetermined direction. The infrared sensor 42 includes the transmitter 42a that is provided on the top face of the cabinet 11 and emits infrared rays, and the receiver 42b that is provided on the top face of the cabinet 11 and receives infrared rays. The receiver 42b receives a measurement wave emitted from the transmitter 42a and reflected by the target object. The infrared sensor 42 calculates a concave-convex shape of the target object based on the intensity of the measurement wave received by the receiver 42b, an incident angle of the measurement wave, and a time from transmission of the measurement wave by the transmitter 42a to reception thereof by the receiver 42b.

The optical sensor 44 is a detector that includes the light receiver 44a provided on the top face of the cabinet 11 and calculates the intensity of light incident on the light receiver 44a. As the optical sensor 44, it is possible to use a detector such as a detector that converts the light received using a photodiode to a voltage and detects the intensity of the light based on the converted voltage value, a detector that detects the intensity of light using a photoresistor or a light dependent resistor (LDR) whose resistance changes depending on the intensity of the light, and a detector that uses solar cells for receiving light to generate power and detects the intensity of light from the power generation.

The capacitance sensor 46 is a detector that detects a capacitance in a measurement location set on the top face of the cabinet 11, especially, near the light emitting portion 34a of the projector 34. The capacitance sensor 46 detects humidity and moisture of the measurement location from the detected capacitance.

The temperature sensor 48 is a detector that detects temperature of a particular area in a predetermined direction (in the present embodiment, a light emission direction of the projector 34). Here, as the temperature sensor, it is possible to use a detector that provides a thermography for detecting temperature of a predetermined area in a predetermined direction, or a temperature detector disposed in two locations in the cabinet 11 and that detects whole temperature of the predetermined area in the predetermined direction from a difference between two temperatures. Here, as the particular area, an area between a wall to which an image is projected or a projection area of a screen and the mobile electronic device 10 is exemplified.

The geomagnetic sensor 50 is a detector that detects a change in geomagnetism around the cabinet. Here, as the geomagnetic sensor, those of a biaxial type and a triaxial type can be adopted, and the detector detects a change in geomagnetism due to a change in a direction of the cabinet. The geomagnetic sensor 50 can also detect the direction of the cabinet with respect to the geomagnetism. The mobile electronic device 10 is basically configured in the above manner.

Figure 4:
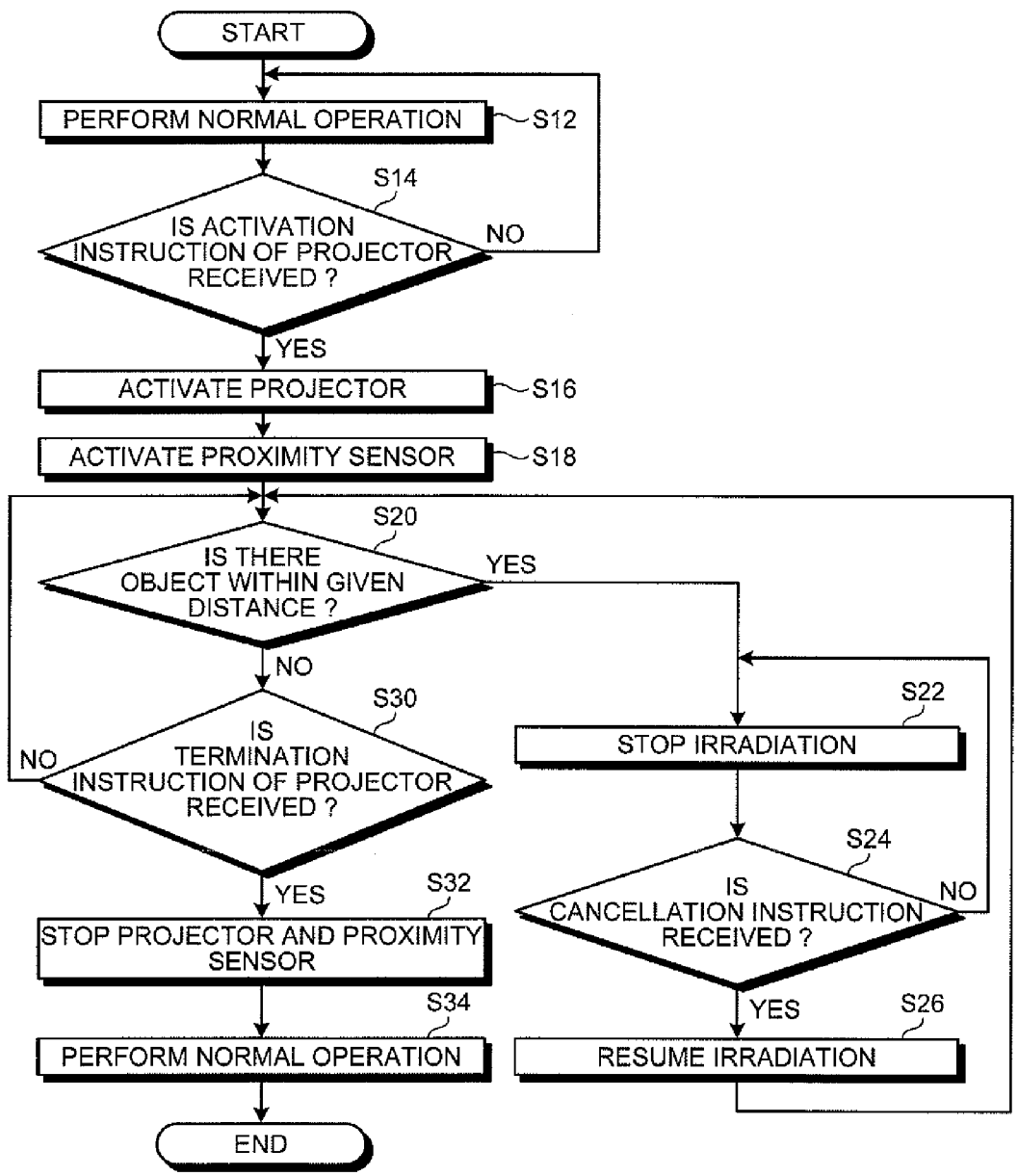
FIG. 4 is a flowchart illustrating one example of the operation of the mobile electronic device.

Next, the operation of the mobile electronic device 10, specifically, the control operation of the projector will be explained with reference to FIG. 4. FIG. 4 is a flowchart illustrating an example of the operation of the mobile electronic device. The flowchart illustrated in FIG. 4 is an example of controlling the operation of the projector 34 using the result of measurement by the proximity sensor 40. First, the mobile electronic device 10 performs a normal operation as Step S12. The normal operation mentioned here indicates a state where any function, other than the projector 34, such as display of a standby image and telephone-call operation, is used. Then, the control unit 22 of the mobile electronic device 10 determines whether an instruction to activate the projector 34 or an activation instruction is received, as Step S14. When it is determined that the activation instruction of the projector 34 is not received (No), the control unit 22 proceeds to Step S12 and continues the normal operation. In this way, the control unit 22 repeats Step S12 and Step S14 until it is detected that the activation instruction of the projector 34 is received.

When it is determined at Step S14 that the activation instruction of the projector is received or it is determined that the activation instruction is received (Yes), the control unit 22 activates the projector 34 as Step S16. The control unit 22 reads a task to control the operation of the projector 34 from the storage unit 24, to activate the application program. This leads to irradiation (emission) of light from the projector 34, and an image is projected to the projection area. Next, after activating the projector 34 at Step S16, the control unit 22 activates the proximity sensor 40 as Step S18.

After activating the proximity sensor 40 at Step S18, the control unit 22 determines, as Step S20, whether there is an object within a given distance based on the result of detection by the proximity sensor 40. Specifically, the control unit 22 causes the proximity sensor 40 to measure a distance to the target object in the predetermined direction and determine whether the distance to the measured target object is a given distance or less. Here, as explained above, when no object is present between the proximity sensor 40 and the screen or the wall for displaying the image, the proximity sensor 40 measures a distance between the proximity sensor 40 and the screen or the wall, as the distance to the target object. If there is any other object between the proximity sensor 40 and the screen or the wall, the proximity sensor 40 measures a distance between the proximity sensor 40 and the other object, as the distance to the target object. The given distance is exemplified as a distance in which an area of projection of the image calculated based on an illumination angle of view of the light emitted from the projector 34 becomes substantially equal to the person's eyes. In other words, the exemplified distance is such that if the eyes are in the distance, almost all the light emitted from the projector 34 enters the eyes.

When it is determined at Step S20 that the object is present within the given distance (Yes) or that the distance to the target object is the given distance or less, the control unit 22 stops irradiation of the light from the projector 34, as Step S22. That is, the control unit 22 causes the projector 34 not to project the image. After the irradiation of the light is stopped at Step S22, the control unit 22 determines whether a cancellation instruction is received, as Step S24. When it is determined at Step S24 that the cancellation instruction is not received (No), then the control unit 22 proceeds to Step S22. That is, the control unit 22 repeats Step S22 and Step S24 until the cancellation instruction is received, and repeats determination as to whether the cancellation instruction is received while the irradiation of the light from the projector 34 is stopped. The cancellation instruction is an instruction to cancel the stop of the irradiation or to resume the irradiation, and is input by the operator.

When it is determined at Step S24 that the cancellation instruction is received (Yes), the control unit 22 resumes the irradiation of the light from the projector 34, as Step S26. That is, the image projection by the projector 34 is resumed. After the irradiation of the light from the projector 34 is resumed at Step S26, the control unit 22 proceeds to Step S20.

When it is determined at Step S20 that the object is not present within the given distance (No) or that the distance to the target object is longer than the given distance, the control unit 22 determines whether an instruction to terminate the drive of the projector 34 or a termination instruction is received, as Step S30. When it is determined at Step S30 that the termination instruction of the projector is not received (No), then the control unit 22 proceeds to Step S20, and again determines whether there is any object within the given distance. That is, the control unit 22 repeats the operations until the drive of the projector 34 is stopped. When it is determined at Step S30 that the termination instruction of the projector is received (Yes), the control unit 22 terminates the drive of the projector 34 and the proximity sensor 40 as Step S32, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 4.

As explained above, the mobile electronic device 10 detects the distance to the object in the predetermined direction or in a direction to which the light is irradiated from the projector 34 using the proximity sensor 40, and stops the irradiation when it is detected that there is an object within the given distance. This enables the irradiation of the light from the projector 34 to be stopped when someone enters within the given distance in the predetermined direction of the projector 34, or when someone enters an area which is irradiated with the light and is close to the projector 34. Therefore, it is possible to prevent the light emitted from the projector 34 from entering person's eyes at a close range, thus reducing the possibility that the person is dazzled with the emitted light. In addition, the light of strong intensity irradiated from the projector 34 can be made hard to enter person's eyes.

Because the mobile electronic device 10 can automatically stop the irradiation of the light based on the result of detection by the proximity sensor 40, the operability can also be enhanced. Even in such an unforeseen case that someone suddenly enters the area but the operator cannot quickly respond, the irradiation of light can be automatically stopped.

Furthermore, when the irradiation of the light from the projector is suspended at Step S22, by setting so that the irradiation of light from the projector is not resumed until the cancellation instruction is received from the operator, the operator can check the safety and then resume the irradiation. For example, if one is present in the projection area but someone is present around the projection area, the operator can prevent the irradiation from resuming.

Here, the embodiment is configured to stop the irradiation of light from the projector 34 and not to emit the light from the projector 34, however, the present invention is not limited thereto, and thus the amount of light emitted from the projector 34 may be reduced. In other words, the amount of light emitted from the projector 34 may be decreased. By stopping the emission of the light from the projector 34, when someone comes in the light emission direction of the projector 34, it can be set so that the light is made hard to enter the person's eyes. However, reduction in the amount of light also allows less possibility that the person is dazzled with the emitted light. In other words, by reducing the amount of light and making the light weak, even if the light emitted from the projector 34 enters the person's eyes, the possibility that the person is dazzled with the emitted light can be reduced.

The embodiment is configured to select whether to stop the irradiation of light from the projector 34 or to leave the irradiation as it is based on whether an object is present within a given distance, however, the present invention is not limited thereto. For example, three or more operations may be able to select according to a distance detected by the proximity sensor 40. For instance, if the distance to the target object is 1 m or more, it is set to continue irradiation of the light as it is. While if the distance to the target object is from 50 cm to less than 1 m, the operator may be caused to select any of those: continuation of the state as it is, reduction in the irradiation of light, and stop of the irradiation of light. If the distance to the target object is from 20 cm to less than 50 cm, the amount of light to be irradiated is reduced, and thereafter, the operator may be caused to select any of those: the continuation of the state as it is, the reduction in the irradiation of light, and the stop of the irradiation of light. If the distance to the target object is less than 20 cm, the amount of light to be irradiated may be reduced. If the distance to the target object is less than 10 cm, the irradiation may be stopped. In this way, by causing the mobile electronic device 10 to select the processing operation from three or more options according to the distance, the operability can be enhanced more. The above distances are examples, and therefore it is not limited to the distances.

The embodiment is configured to control the amount of light to be irradiated from the projector according to the measurement result of the distance measured by the proximity sensor 40, however, the present invention is not limited thereto, and therefore, the amount of light may be controlled according to a change in the distance. For example, when the distance to the target object is changed from 1 m to 10 cm, it is determined that an object (e.g., person) enters an area between the mobile electronic device 10 and the screen or the wall projected with an image, and the irradiation of light from the projector 34 may be stopped or the amount of light may be reduced. In this way, by controlling the irradiation of light based on the change in the distance, the possibility that the light irradiated from the projector 34 may enter the person's eyes at a close range can be reduced. Moreover, the embodiment can deal with even a case in which the operator moves or turns the mobile electronic device 10, and an irradiation direction of the light from projector 34 thereby changes, and in which the target object is changed to some other one, and a distance to the object thereby suddenly changes. In this way, the control based on the change in the distance also enables the safety and the operability to be enhanced.

The embodiment is configured to form the proximity sensor with the transmitter and the receiver, so that the measurement wave transmitted (sent) from the transmitter is received by the receiver, however, the projector 34 may be used as the transmitter. In other words, the light irradiated from the projector 34 is set as the measurement wave, and the light reflected by the target object may be received by the receiver. As the proximity sensor, any device is used if it can measure a distance to the target object, and, for example, a measuring device for measuring a distance to the target object by magnetism or an electric field can also be used.

Figure 5:
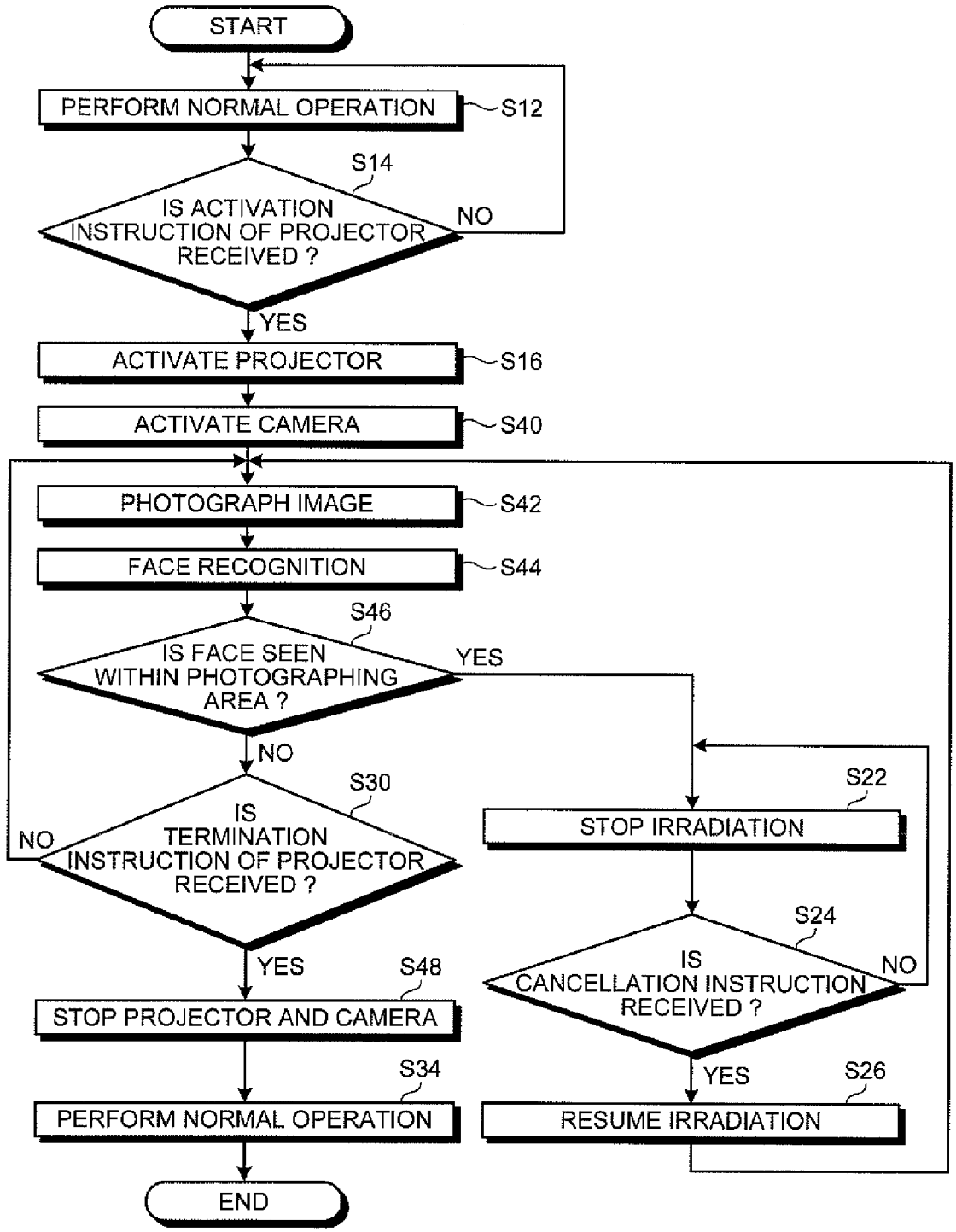
FIG. 5 is a flowchart illustrating another example of the operation of the mobile electronic device.

The embodiment has explained the operation based on the proximity sensor 40, however, the present invention is not limited thereto. Another example of the operation of the mobile electronic device 10, specifically, of the control operation of the projector will be explained below with reference to FIG. 5. FIG. 5 is a flowchart illustrating another example of the operation of the mobile electronic device. The flowchart illustrated in FIG. 5 is an example of controlling the operation of the projector 34 using the camera 38. Here, because the flowchart illustrated in FIG. 5 has portions being the same operations as these of FIG. 4, detailed explanation of the overlapping portions is omitted, and operations specific to the flowchart illustrated in FIG. 5 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the camera 38 as Step S40.

After activating the camera 38 at Step S40, the control unit 22 photographs an image using the camera 38, as Step S42. In other words, an image in an irradiation direction of the light of the projector 34 is photographed by the camera 38. After the image is photographed at Step S42, the control unit 22 performs face recognition as Step S44. In other words, a face (human face) is extracted from the image photographed by using face recognition software or the like. At this time, an image projected to a target object by the projector 34 is included in the image photographed by the camera 38, and an image including a face may be projected by the projector 34. As for this point, the control unit 22 can be configured to set so as not to extract the face included in the image projected by the projector 34 by comparing the image photographed by the camera 38 with the data for the image projected by the projector 34 and removing an image portion projected by the projector 34 from the photographed image. An analyzer for analyzing the image may be provided as software inside the control unit or may be separately provided.

After performing the face recognition at Step S44, the control unit 22 determines whether the face is within a photographing area, as Step S46. That is, the control unit 22 determines whether the face is included in the photographed image based on the result of face recognition performed at Step S44. At Step S46, when it is determined that the face is within the photographing area (Yes), the control unit 22 proceeds to Step S22, while when it is determined that the face is not within the photographing area (No), the control unit 22 proceeds to Step S30. The operations from Step S22 to Step S26 are the same as these illustrated in FIG. 4, and thus explanation thereof is omitted.

When it is determined at Step S46 that no face is within the photographing area (No), the control unit 22 determines whether an instruction to terminate the drive of the projector 34 or a termination instruction is received, as Step S30. When it is determined at Step S30 that the termination instruction of the projector is not received (No), the control unit 22 proceeds to Step S42, photographs again an image at Step S42, performs face recognition at Step S44, and determines at Step S46 whether the face is within the photographing area. That is, the control unit 22 repeats the operations until the drive of the projector 34 is stopped. When it is determined at Step S30 that the termination instruction of the projector is received (Yes), the control unit 22 terminates the drive of the projector 34 and the camera 38 as Step S48, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 5.

In this way, even by photographing the state in the predetermined direction by the camera and determining whether a person's face is in the projection area and its surroundings based on the acquired image, it is possible to prevent the person's face from being irradiated with the light emitted from the projector 34.

The embodiment is configured to make an area photographed by the camera wider than an area (projection area) to which an image is projected by the projector 34, however, the present invention is not limited thereto, and thus the area photographed by the camera may be made the same as the projection area. In addition, a wider area than the projection area is photographed, and the face recognition may be performed on only a portion being the projection area of the photographed area.

Figure 6:
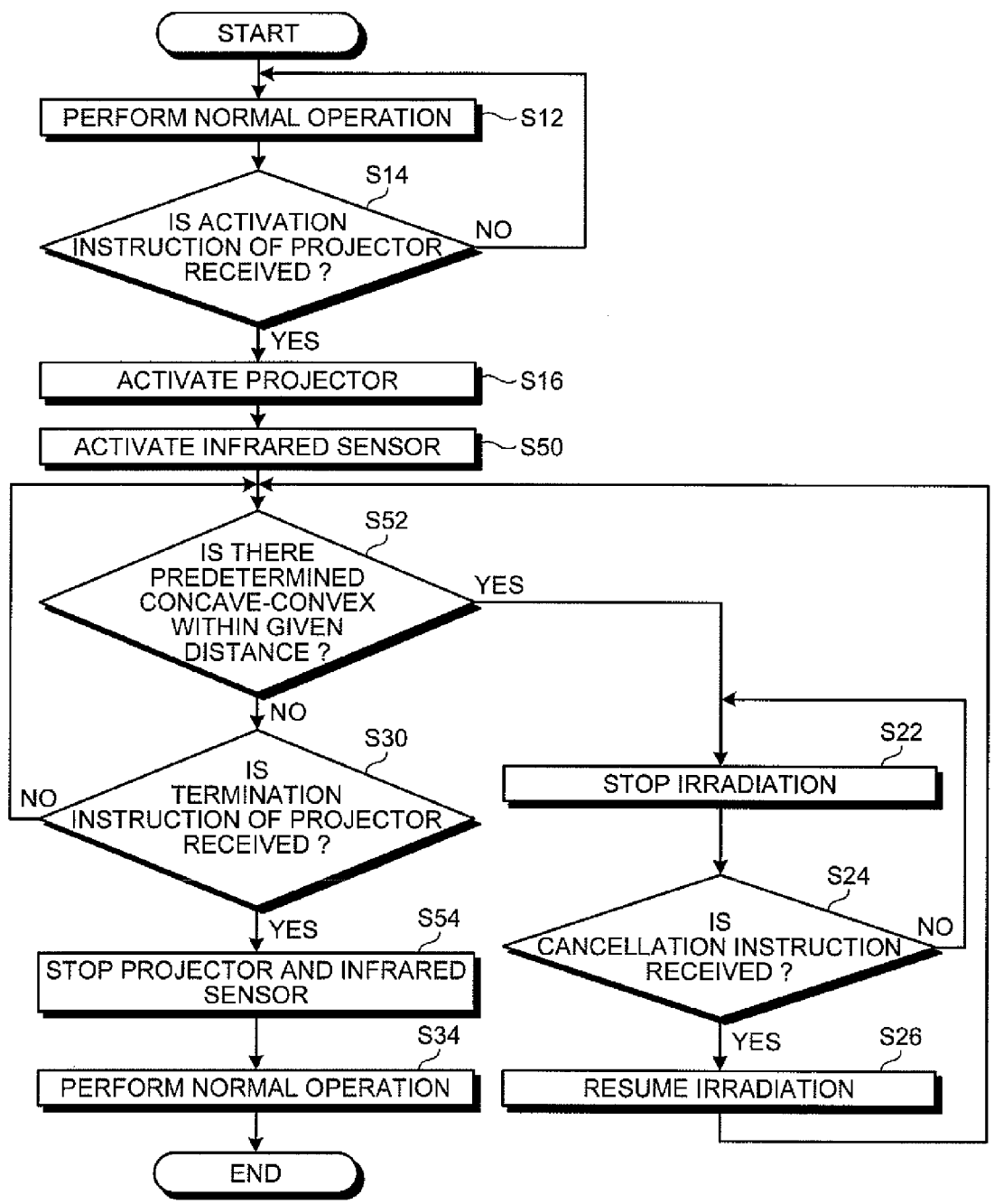
FIG. 6 is a flowchart illustrating another example of the operation of the mobile electronic device.

Next, further another example of the operation of the mobile electronic device 10, specifically, of the control operation of the projector will be explained with reference to FIG. 6. FIG. 6 is a flowchart illustrating another example of the operation of the mobile electronic device. The flowchart illustrated in FIG. 6 is an example of controlling the operation of the projector 34 using the infrared sensor 42. Here, because the flowchart illustrated in FIG. 6 has portions being the same operations as these of FIG. 4, detailed explanation of the overlapping portions is omitted, and operations specific to the flowchart illustrated in FIG. 6 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the infrared sensor 42 as Step S50.

After activating the infrared sensor 42 at Step S50, the control unit 22 determines whether there is predetermined concave-convex within a given distance, as Step S52. Specifically, the control unit 22 detects concave-convex of a target object in a predetermined direction by the infrared sensor 42 and analyzes the detected concave-convex. The control unit 22 determines whether there is concave-convex that can be recognized as the face within the given distance (specifically, within an area in an irradiation direction of the light by the projector 34 and near the projector 34) based on the result of analysis. Here, concave-convex patterns that can be recognized as faces and permissible values of the concave-convex are previously set, and the control unit 22 compares the detected concave-convex with the set value, to determine whether the detected concave-convex can be recognized as the face. The given distance is exemplified as a distance such that an area of projection of the image calculated based on an illumination angle of view of the light emitted from the projector 34 becomes substantially equal to that of the person's eyes. In other words, if the eyes are in the distance, such a distance that almost all the light emitted from the projector 34 enters the eyes is exemplified.

At Step S52, when it is determined that there is a predetermined concave-convex within the given distance (Yes), the control unit 22 proceeds to Step S22, while when it is determined that there is no predetermined concave-convex within the given distance (No), the control unit 22 proceeds to Step S30. The operations from Step S22 to Step S26 are the same as these illustrated in FIG. 4, and thus explanation thereof is omitted.

When it is determined at Step S52 that there is no predetermined concave-convex within the given distance (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S52, and again determines whether there is predetermined concave-convex within the given distance. That is, the control unit 22 repeats the operations until the drive of the projector 34 is stopped. When it is determined at Step S30 that the termination instruction of the projector is received (Yes), the control unit 22 terminates the drive of the projector 34 and the infrared sensor 42 as Step S54, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 6.

In this way, even by detecting whether there is concave-convert that can be recognized as person's face near the projector 34 based on the concave-convert in the predetermined direction detected by the infrared sensor 42, it is possible to make the person's face hard to be irradiated with the light emitted from the projector 34.

The control unit 22 may detect an entire face based on the concave-convex detected by the infrared sensor 42, and may also detect part of the face, such as eyes, nose, eyes and nose, and eye and ear. In addition, the control unit 22 may detect, not the face, but an entire body of the person. The embodiment explains the case where someone's face is within the given distance, however, if someone's face is within a detected area by the infrared sensor 42, the irradiation of the light from the projector 34 may be stopped.

Figure 7:
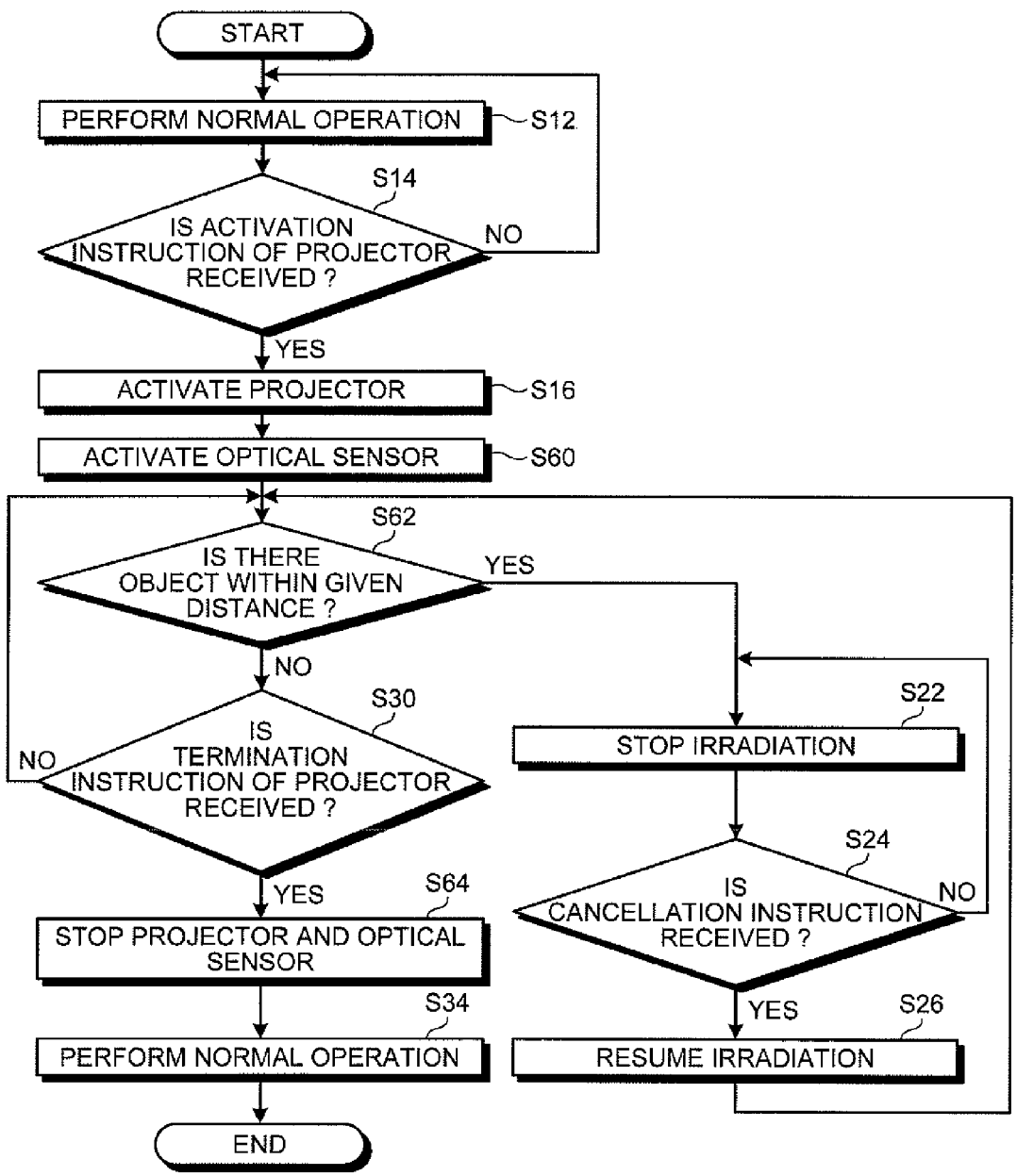
FIG. 7 is a flowchart illustrating another example of the operation of the mobile electronic device.

Next, further another example of the operation of the mobile electronic device 10, specifically, of the control operation of the projector will be explained with reference to FIG. 7. FIG. 7 is a flowchart illustrating another example of the operation of the mobile electronic device. The flowchart illustrated in FIG. 7 is an example of controlling the operation of the projector 34 using the optical sensor 44. Here, because the flowchart illustrated in FIG. 7 has portions being the same operations as these of FIG. 4, detailed explanation of the overlapping portions is omitted, and operations specific to the flowchart illustrated in FIG. 7 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the optical sensor 44 as Step S60.

After activating the optical sensor 44 at Step S60, the control unit 22 determines, as Step S62, whether there is any object within a given distance. Specifically, the control unit 22 measures a distance to the target object based on the light received by the optical sensor 44. For example, the light emitted from the projector 34 provided in the same plane as the optical sensor 44 and reflected by the target object enters the optical sensor 44. The intensity of the reflected light becomes higher as the distance to the target object is getting shorter. The optical sensor 44 calculates the distance to the target object from the light intensity changing according to the distance to the target object in this manner. The given distance is the same as that of the proximity sensor.

At Step S62, when it is determined that the object is present within the given distance (Yes), the control unit 22 proceeds to Step S22, while when it is determined that the predetermined object is not present within the given distance (No), the control unit 22 proceeds to Step S30. The operations from Step S22 to Step S26 are the same as these illustrated in FIG. 4, and thus explanation thereof is omitted.

When it is determined at Step S62 that the object is not present within the given distance (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S62, and again determines whether there is any object within the given distance. That is, the control unit 22 repeats the operations until the drive of the projector 34 is stopped. When it is determined at Step S30 that the termination instruction of the projector is received (Yes), the control unit 22 terminates the drive of the projector 34 and the optical sensor 44 as Step S64, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 7.

In this way, even by controlling the operation of the projector 34 according to the distance to the target object calculated based on the result of measurement by the optical sensor 44, it is possible to prevent the person's face from being irradiated with the light emitted from the projector 34.

Figure 8:
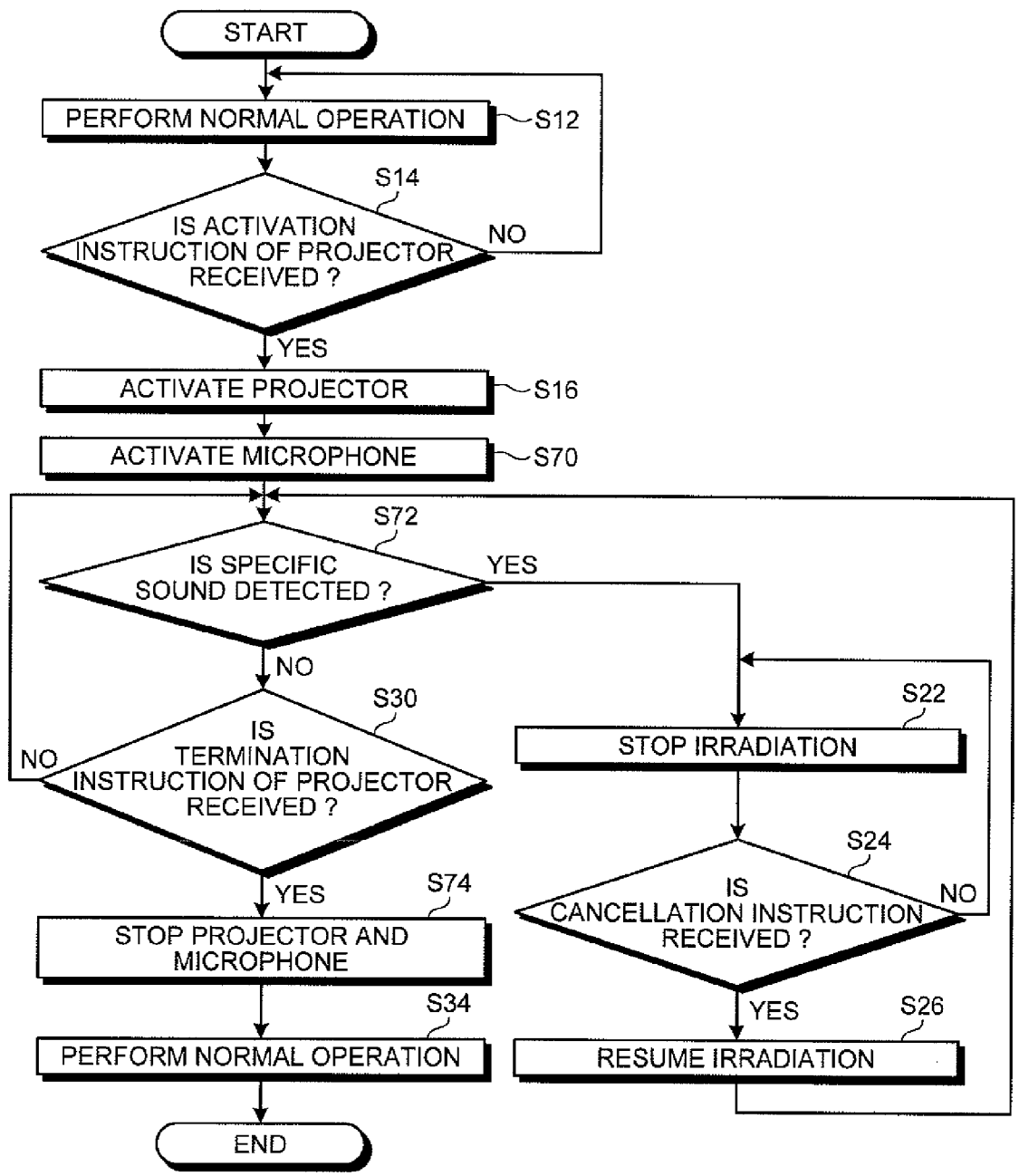
FIG. 8 is a flowchart illustrating another example of the operation of the mobile electronic device.

Next, further another example of the operation of the mobile electronic device 10, specifically, of the control operation of the projector will be explained with reference to FIG. 8. FIG. 8 is a flowchart illustrating another example of the operation of the mobile electronic device. The flowchart illustrated in FIG. 8 is an example of controlling the operation of the projector 34 using the microphone 15. Here, because the flowchart illustrated in FIG. 8 has portions being the same operations as these of FIG. 4, detailed explanation of the overlapping portions is omitted, and operations specific to the flowchart illustrated in FIG. 8 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the microphone 15 as Step S70.

After activating the microphone 15 at Step S70, the control unit 22 determines, as Step S72, whether any specific sound is detected by the microphone 15. Specifically, sounds in the surrounding are picked up by the activated microphone 15. The picked-up sounds are processed by the voice processor 30, and are sent to the control unit 22. The control unit 22 analyzes the sounds using voice recognition software or the like, and detects whether there is a specific sound in the sounds. The specific sound mentioned here refers to a sound like danger sense scream, for example, words "Eek!", "Watch out!", "Stop!", and its frequency ranges from 500 Hz to 1 kHz or from 1 kHz to 2 kHz. The sound whose frequency ranges from 500 Hz to 1 kHz is a voice mainly uttered by men, while the sound whose frequency ranges from 1 kHz to 2 kHz is a voice mainly uttered by women. When an image of a film or a program is projected by the projector 34, the voice corresponding to the film or the program may be output from the receiver 16 or from a separately provided speaker. In this case, similarly to the camera, the voice output from the receiver 16 or from the speaker is removed from the picked-up sound, and thereafter the voice is simply analyzed. As the microphone for the mobile electronic device 10, it is preferable to use a pick-up directional microphone and synchronize directionality of the microphone with a projection direction of the image by the projector. This allows the change in the sound within the photographing area to be easily detected.

At Step S72, when it is determined that the specific sound is detected (Yes), the control unit 22 proceeds to Step S22, while when it is determined that the specific sound is not detected (No), the control unit 22 proceeds to Step S30. The operations from Step S22 to Step S26 are the same as these illustrated in FIG. 4, and thus explanation thereof is omitted.

When it is determined at Step S72 that the specific sound is not detected (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S72, and again determines whether any specific sound is detected. That is, the control unit 22 repeats the operations until the drive of the projector 34 is stopped. When it is determined at Step S30 that the termination instruction of the projector is received (Yes), the control unit 22 terminates the drive of the projector 34 and the microphone 15 as Step S74, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 8.

In this way, by controlling the operation of the projector 34 based on the voice, it is possible to stop the irradiation of the light from the projector 34 before the mobile electronic device 10 is manipulated. In other words, even in a case where the manipulation cannot quickly respond, the mobile electronic device 10 senses danger and is able to stop the irradiation of the light from the projector 34.

In the embodiment, the microphone 15 for use in telephone call provided in the mobile electronic device 10 is used as a microphone to pick up sounds, however, another microphone different from the microphone 15 may be provided.

Figure 9:
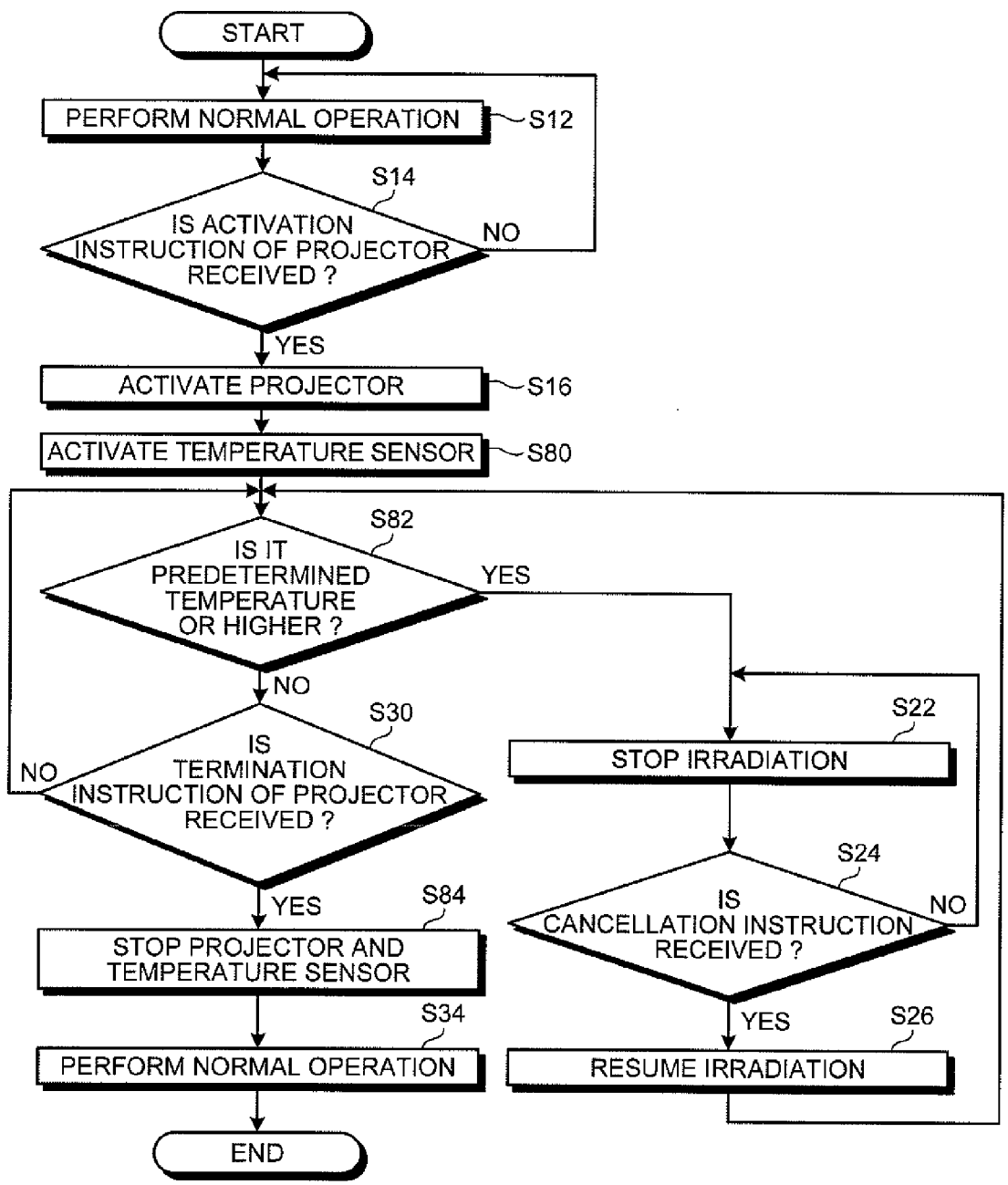
FIG. 9 is a flowchart illustrating another example of the operation of the mobile electronic device.

Next, further another example of the operation of the mobile electronic device 10, specifically, of the control operation of the projector will be explained with reference to FIG. 9. FIG. 9 is a flowchart illustrating another example of the operation of the mobile electronic device. The flowchart illustrated in FIG. 9 is an example of controlling the operation of the projector 34 using the temperature sensor 48. Here, because the flowchart illustrated in FIG. 9 has portions being the same operations as these of FIG. 4, detailed explanation of the overlapping portions is omitted, and operations specific to the flowchart illustrated in FIG. 9 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the temperature sensor 48 as Step S80.

After activating the temperature sensor 48 at Step S80, the control unit 22 determines, as Step S82, whether the temperature detected by the temperature sensor 48 is a predetermined temperature or higher. Specifically, the control unit 22 determines whether a temperature in a predetermined direction (irradiation direction of light from the projector 34) detected by the temperature sensor 48 is a predetermined temperature or higher. The predetermined temperature mentioned here refers to a temperature detected due to the presence of human.

At Step S82, when it is determined that the temperature is the predetermined temperature or higher (Yes), the control unit 22 proceeds to Step S22, while when it is determined that the temperature is not the predetermined temperature or higher, or is lower than the predetermined temperature (No), the control unit 22 proceeds to Step S30. The operations from Step S22 to Step S26 are the same as these illustrated in FIG. 4, and thus explanation thereof is omitted.

When it is determined at Step S82 that the temperature is not the predetermined temperature or higher (No), or is lower than the predetermined temperature, the control unit 22 determines whether an instruction to terminate the drive of the projector 34 or a termination instruction is received, as Step S30. When it is determined at Step S30 that the termination instruction of the projector is not received (No), then the control unit 22 proceeds to Step S82, and again determines whether the temperature is the predetermined temperature or higher. That is, the control unit 22 repeats the operations until the drive of the projector 34 is stopped. When it is determined at Step S30 that the termination instruction of the projector is received (Yes), the control unit 22 terminates the drive of the projector 34 and the temperature sensor 48 as Step S84, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 9.

In this way, by controlling the operation of the projector 34 based on the temperature in the predetermined direction, it is possible to detect whether somebody is present in the predetermined direction.

Figure 10:
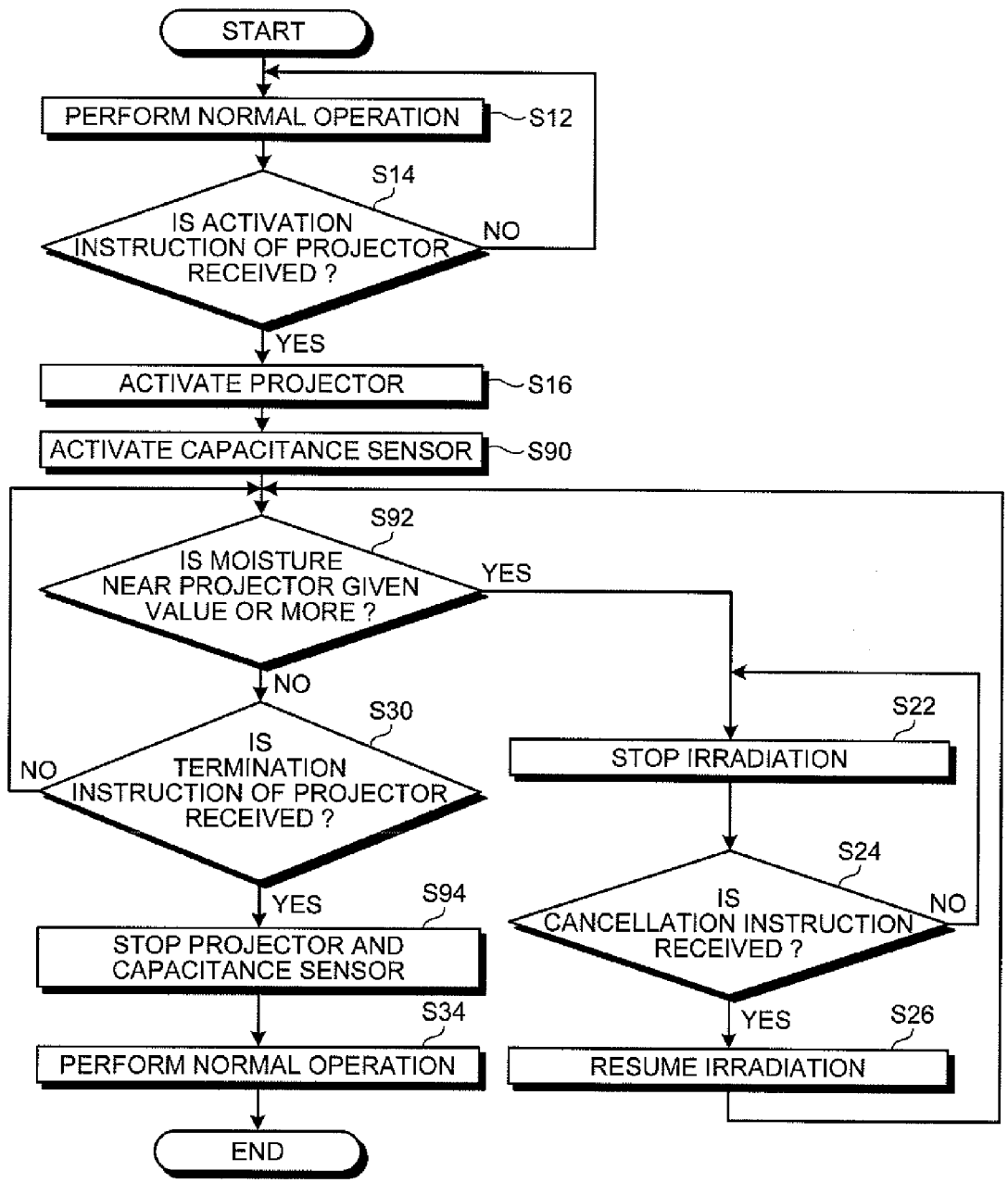
FIG. 10 is a flowchart illustrating another example of the operation of the mobile electronic device.

Next, further another example of the operation of the mobile electronic device 10, specifically, of the control operation of the projector will be explained with reference to FIG. 10. FIG. 10 is a flowchart illustrating another example of the operation of the mobile electronic device. The flowchart illustrated in FIG. 10 is an example of controlling the operation of the projector 34 using the capacitance sensor 46. Here, because the flowchart illustrated in FIG. 10 has portions being the same operations as these of FIG. 4, detailed explanation of the overlapping portions is omitted, and operations specific to the flowchart illustrated in FIG. 10 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the capacitance sensor 46 as Step S90.

After activating the capacitance sensor 46 at Step S90, the control unit 22 determines, as Step S92, whether moisture near the projector 34 (light emitting portion 34a) is a given value or more. Specifically, the control unit 22 calculates moisture near the projector 34 based on the capacitance measured by the activated capacitance sensor 46, and determines whether the calculated moisture is the given value or more. The given value mentioned here refers to a value indicating a possibility that water droplets may adhere to the light emitting portion 34a, or a value indicating a possibility that the light emitting portion 34a may be filled with water vapor.

At Step S92, when it is determined that the moisture is the given value or more (Yes), the control unit 22 proceeds to Step S22, while when it is determined that the moisture is not the given value or more, or the moisture is lower than the given value (No), the control unit 22 proceeds to Step S30. The operations from Step S22 to Step S26 are the same as these illustrated in FIG. 4, and thus explanation thereof is omitted.

When it is determined at Step S92 that the moisture is not the given value or more (No), or that the moisture is lower than the given value, the control unit 22 determines whether an instruction to terminate the drive of the projector 34 or a termination instruction is received, as Step S30. When it is determined at Step S30 that the termination instruction of the projector is not received (No), then the control unit 22 proceeds to Step S92, and again determines whether the moisture is the given value or more. That is, the control unit 22 repeats the operations until the drive of the projector 34 is stopped. When it is determined at Step S30 that the termination instruction of the projector is received (Yes), the control unit 22 terminates the drive of the projector 34 and the capacitance sensor as Step S94, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 10.

In this way, by controlling the operation of the projector 34 based on the moisture (humidity) calculated from the capacitance, it is possible to reduce convergence of light emitted from the projector 34 due to lens effect of the water droplets adhering to the light emitting portion 34a and to reduce irradiation of the light in unspecified directions due to refraction of the light by the water droplets. This makes it possible to reduce irradiation of the light emitted from the projector 34 at strong intensity through one point and to reduce irradiation of the light emitted from the projector 34 to an area other than the projection area. In addition, the light emitted from the projector 34 can be prevented from becoming stronger light. In the present embodiment, moisture is detected, and this also makes it possible to detect that the mobile electronic device falls in the water or is water-soaked. In this case, also, the irradiation of the image is stopped. This enables the drive of the projector 34 to be stopped in an emergency, thus making the mobile electronic device hard to be damaged.

Figure 11:
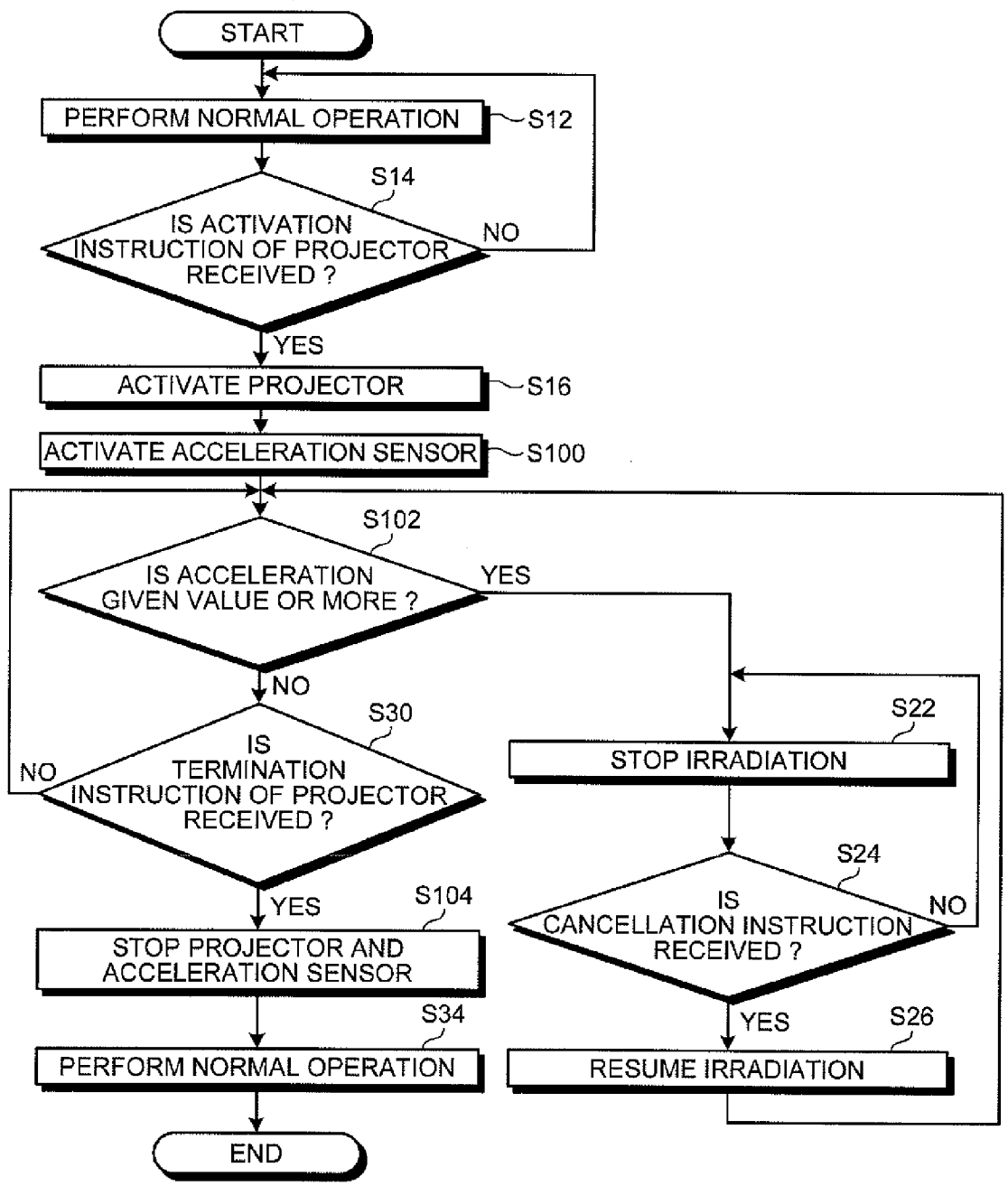
FIG. 11 is a flowchart illustrating another example of the operation of the mobile electronic device.

Next, further another example of the operation of the mobile electronic device 10, specifically, of the control operation of the projector will be explained with reference to FIG. 11. FIG. 11 is a flowchart illustrating another example of the operation of the mobile electronic device. The flowchart illustrated in FIG. 11 is an example of controlling the operation of the projector 34 using the acceleration sensor 36. Here, because the flowchart illustrated in FIG. 11 has portions being the same operations as these of FIG. 4, detailed explanation of the overlapping portions is omitted, and operations specific to the flowchart illustrated in FIG. 11 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the acceleration sensor 36 as Step S100.

After activating the acceleration sensor 36 at Step S100, the control unit 22 determines, as Step S102, whether an acceleration of a given value or more is detected. Specifically, if the force is externally applied to the mobile electronic device 10 fixed to a given location and the mobile electronic device 10 is thereby moved, the acceleration sensor 36 detects the movement using the acceleration. The control unit 22 determines whether the acceleration detected by the acceleration sensor 36 is the given value or more. The acceleration of a given value or more mentioned here refers to an acceleration capable of detecting that the mobile electronic device 10 is moved or shaken by the operator. An acceleration higher than an acceleration detected as noise and an acceleration higher than a fine acceleration caused by vibration when a person walks along the ground may be determined as an acceleration of the given value or more.

At Step S102, when it is determined that the acceleration is the given value or more (Yes), the control unit 22 proceeds to Step S22, while when it is determined that the acceleration is not the given value or more, or the acceleration is lower than the given value and there is no change in the state (No), the control unit 22 proceeds to Step S30. The operations from Step S22 to Step S26 and the operation at Step S30 are the same as these illustrated in FIG. 4, and thus explanation thereof is omitted.

When it is determined at Step S30 that the termination instruction of the projector is received (Yes), the control unit 22 terminates the drive of the projector 34 and the acceleration sensor 36 as Step S104, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 11.

In this way, by controlling the operation of the projector 34 based on the acceleration, it is possible to stop the irradiation of the light emitted from the projector 34 when the external force is applied to the mobile electronic device 10 and the state thereby changes. With this feature, for example, when sensing the danger, the operator flicks or shakes the mobile electronic device 10, so that the irradiation of the light from the projector 34 can be stopped. This enables the operator to stop the irradiation of the light from the projector 34 with a simple operation and a momentary operation and to prevent the light from being irradiated to unspecified positions even if the mobile electronic device 10 is flicked. Moreover, if someone suddenly picks up the mobile electronic device 10 on a desk, the irradiation of the light from the projector 34 can be stopped. This makes it possible to prevent the light from being emitted from the projector 34 when the projection area is suddenly changed or when the projection area is displaced by an unexpected operation.

Figure 12:
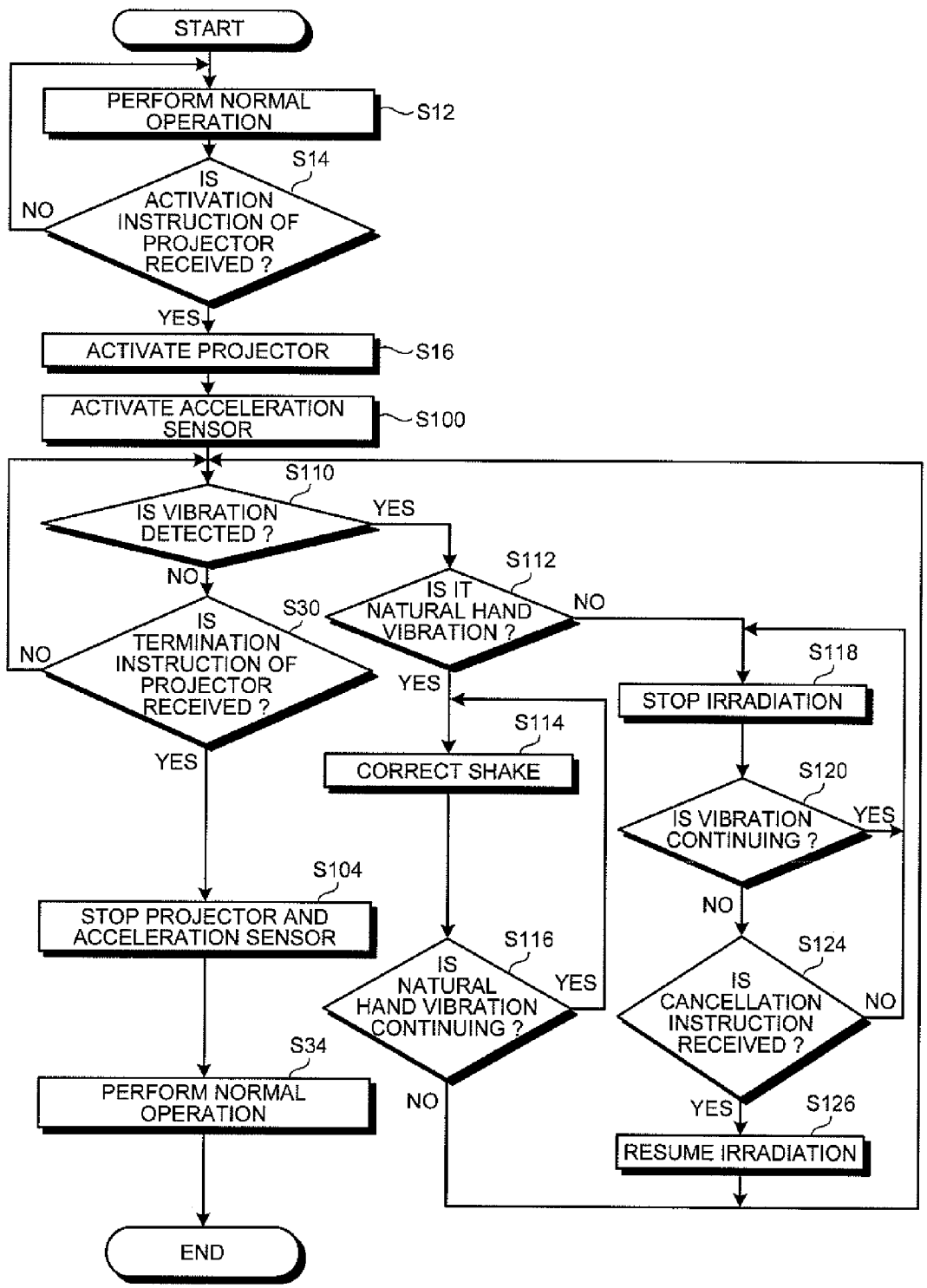
FIG. 12 is a flowchart illustrating another example of the operation of the mobile electronic device.

In a case where the operator uses the projector 34 while holding the mobile electronic device 10 in hand, it is preferable to process in the following manner. FIG. 12 is a flowchart illustrating another example of the operation of the mobile electronic device. Here, because the flowchart illustrated in FIG. 12 has portions being the same operations as these of FIG. 11, detailed explanation of the overlapping portions is omitted, and operations specific to the flowchart illustrated in FIG. 12 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. After activating the projector 34 at Step S16, the control unit 22 activates the acceleration sensor 36 as Step S100.

After activating the acceleration sensor 36 at Step S100, the control unit 22 determines, as Step S110, whether a vibration is detected. That is, the control unit 22 determines whether an acceleration of a given value or more is measured by the acceleration sensor 36. The acceleration of the given value or more mentioned here refers to an acceleration the same as the above-mentioned acceleration of the given value or more.

When it is determined at Step S110 that the vibration is detected (Yes), the control unit 22 determines whether the detected vibration is a natural hand vibration, as Step S112. Here, whether the vibration is the natural hand vibration is determined based on its detected frequency (cycle of acceleration) and amplitude (magnitude of acceleration). As one example, a vibration whose frequency is 10 Hz or less can be determined as the natural hand vibration.

When it is determined at Step S112 that the vibration is the natural hand vibration (Yes), the control unit 22 performs shake correction as Step S114. Specifically, the control unit 22 corrects the shake of an image projected by the projector 34. That is, the control unit 22 causes the projector 34 to project an image to which the measures for the effect of the natural hand vibration are taken. After performing the shake correction at Step S114, the control unit 22 determines whether the natural hand vibration is continuing as Step S116. Specifically, the control unit 22 determines whether a vibration has occurred and the vibration is a natural hand vibration based on the result of measurement by the acceleration sensor 36. When the vibration has occurred and the vibration is the natural hand vibration, the control unit 22 determines that the natural hand vibration is continuing. When the vibration has not occurred or the vibration is not the natural hand vibration, the control unit 22 determines that the natural hand vibration is not continuing.

When it is determined at Step S116 that the natural hand vibration is continuing (Yes), the control unit 22 proceeds to Step S114. That is, the control unit 22 repeats Step S114 and Step S116 while the natural hand vibration is continuing. When it is determined at Step S116 that the natural hand vibration is not continuing (No), the control unit 22 proceeds to Step S110, and determines again whether a vibration is detected.

When it is determined at Step S112 that the vibration is not the natural hand vibration (No), or when it is determined that the vibration is larger than the natural hand vibration, the control unit 22 stops the irradiation of the light from the projector 34 as Step S118. That is, the control unit 22 causes the projector 34 not to project an image. The control unit 22 stops the irradiation of the light at Step S118, and determines whether the vibration is continuing as Step S120. At Step S120, when the vibration larger than the natural hand vibration is detected by the acceleration sensor 36, the control unit 22 determines that the vibration is continuing, while when the vibration larger than the natural hand vibration is not detected, the control unit 22 determines that the vibration is not continuing. When it is determined at Step S120 that the vibration is continuing (Yes), the control unit 22 proceeds to Step S118. That is, the control unit 22 stops the irradiation of the light and repeats Step S118 and Step S120 while the vibration is continuing.

When it is determined at Step S120 that the vibration is not continuing (No), the control unit 22 determines whether a cancellation instruction is received as Step S124. When it is determined at Step S124 that the cancellation instruction is not received (No), the control unit 22 proceeds to Step S118. That is, the control unit 22 repeats from Step S118 to Step S124 until the cancellation instruction is received, and repeats determination as to whether the vibration is continuing and the cancellation instruction is received while the irradiation of light from the projector 34 is stopped. The cancellation instruction is an instruction to cancel the stop of the irradiation or an instruction to resume the irradiation, and is an instruction input by the operator.

When it is determined at Step S124 that the cancellation instruction is received (Yes), the control unit 22 causes the projector 34 to resume irradiation of the light as Step S126. That is, the control unit 22 causes the projector 34 to resume projection of an image. After the irradiation of light from the projector 34 is resumed at Step S126, the control unit 22 proceeds to Step S110.

When it is determined at Step S110 that the vibration is not detected (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S110, and again determines whether a vibration is detected. That is, the control unit 22 repeats the operations until the drive of the projector 34 is stopped. When it is determined at Step S30 that the termination instruction of the projector is received (Yes), the control unit 22 terminates the drive of the projector 34 and the acceleration sensor 36 as Step S104, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 12.

In this way, even when the vibration is detected, by determining whether the detected vibration is natural hand vibration, an image can be projected from the projector 34 even when the operator manipulates the mobile electronic device 10 while holding it. When projection of an image is desired to be stopped, by intentionally shaking the mobile electronic device 10, the irradiation of the image can be stopped. If it drops, the irradiation of the image is also stopped. This allows high operability while safety is highly maintained. In the present embodiment, because a more appropriate image can be displayed, the shake correction is performed, however, the shake correction is not necessarily performed.

As explained above, in each case, when the irradiation of light from the projector 34 is suspended at Step S22 or Step S118, by causing the projector not to resume the irradiation of light until the cancellation instruction is received from the operator, the operator can check the safety and resume it. For example, if someone is present not in the projection area but around the projection area, it is configured so as not to resume the irradiation. This can lead to further enhancement of the safety.

Each of the embodiments is configured to stop the irradiation of light from the projector 34 and therefore not to emit the light from the projector 34, however, the present invention is not limited thereto. Similarly to the case of the proximity sensor 40, the amount of light emitted from the projector 34 may be reduced. By stopping the emission of the light from the projector 34, when a person comes in the emission direction of the light from the projector 34, the light can be made hard to enter person's eyes. However, even by reducing the amount of light, the possibility that the person is dazzled by the emitted light can be decreased. In other words, by reducing the light amount and decreasing the light, even if the light emitted from the projector 34 may enter person's eyes, the possibility that the person is dazzled by the emitted light can be reduced.

In each of the embodiments, a measurement target (target to be measured) area may be set as the same area as the projection area, however, the measurement target area is preferably made wider than an area (projection area) where the projector 34 projects an image. By making the measurement target area wider than the projection area of the projector 34, a case in which someone (face) is about to enter the projection area can also be detected.

The embodiments are configured to calculate, based on measured values by the proximity sensor, the infrared sensor, and the optical sensor, a distance from each of the sensors to a target object. However, a position set as a reference in the mobile electronic device side is not limited to the sensors, and therefore a relative position between each of the sensors and the projector 34 and a relative position between each of the sensors and the top face of the cabinet are previously calculated. Then, a distance between the projector 34 and the target object and a distance between the top face of the cabinet and the target object are calculated, and control may be provided based on the calculated distances.

The embodiments are configured that the control unit 22 always detects values detected by the sensors. In other words, the operation of the projector is controlled at any time when a specific change is detected based on the values detected by the sensors, however, if the operation of the projector can be controlled based on the values detected by the sensors, the process is not limited thereto. For example, when each of the detected values is processed by the sensor separately from the process by the control unit and the detected value by the sensor is in a given state, or when the detected value becomes a value which can be determined that an output of the light illuminated from the projector 34 needs to be reduced or stopped, the state is notified to the control unit. When receiving the notification, the control unit may control the operation of the projector.

Moreover, the sensors according to the embodiments may be used in combination thereof. The mobile electronic device 10 according to the embodiments is configured to include all the sensors, however, the mobile electronic device may include only part of the sensors depending on its use configuration.

Figure 13A:
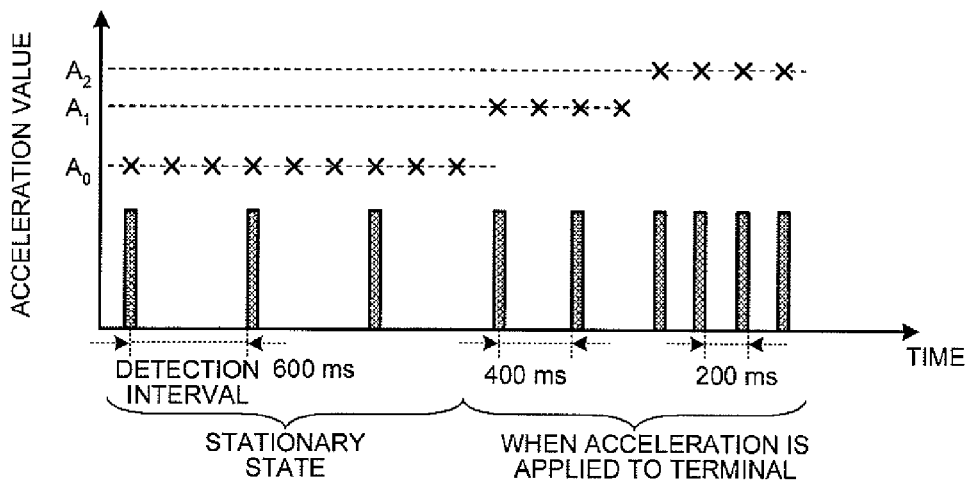
FIG. 13A is an explanatory diagram illustrating details of control for the operation of the mobile electronic device.
Figure 13B:
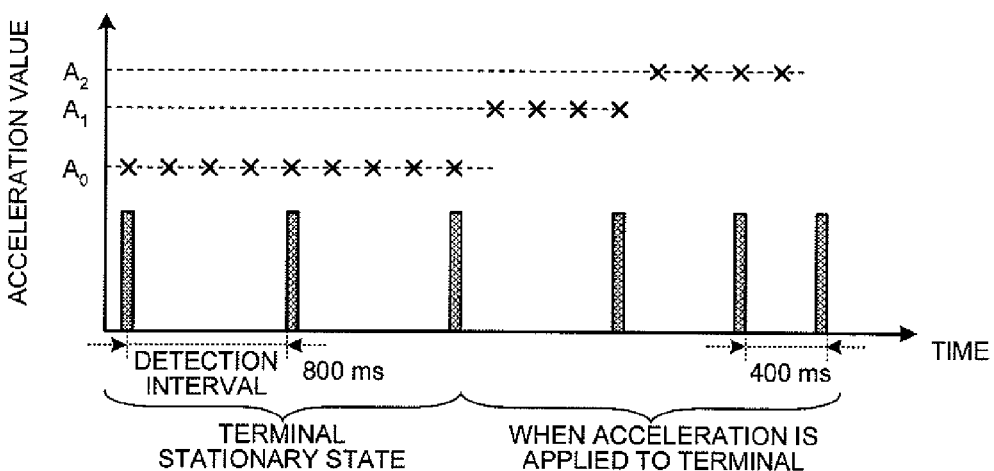
FIG. 13B is an explanatory diagram illustrating details of control for the operation of the mobile electronic device.
Figure 13C:
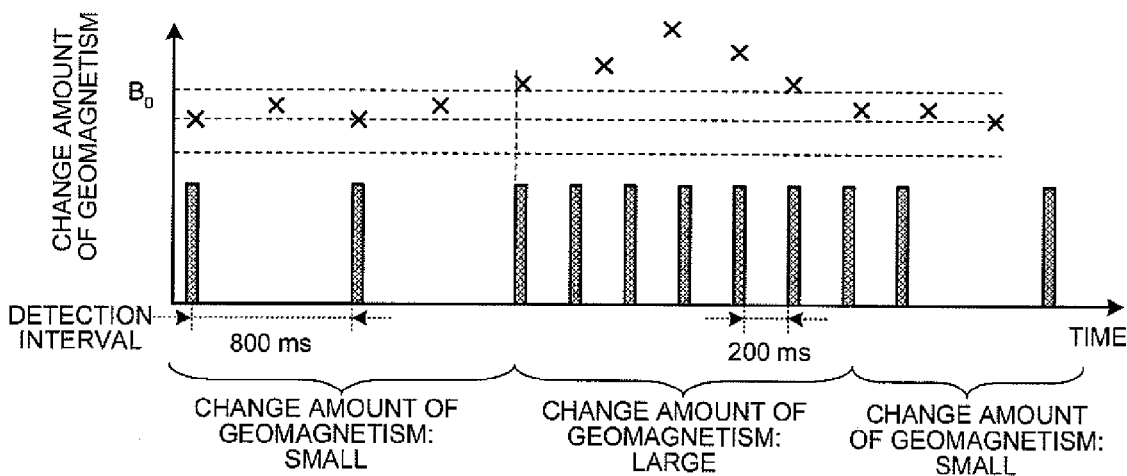
FIG. 13C is an explanatory diagram illustrating details of control for the operation of the mobile electronic device.

Here, the mobile electronic device 10 may be configured to make operation timing of the detector different according to an acceleration value applied to the cabinet 11 detected by the acceleration sensor 36 and/or according to a change amount of geomagnetism applied to the cabinet 11 detected by the geomagnetic sensor 50. Specifically, the mobile electronic device 10 may be configured to combine the control based on the result of detection by each of the units in FIG. 5 to FIG. 10 with the control based on the results of detection by the acceleration sensor 36 and/or the geomagnetic sensor 50 and to determine timing of measuring a measurement target by the detector based on the acceleration value and/or the change amount of the geomagnetism applied to the cabinet 11. This matter will be explained below with reference to FIG. 13A to FIG. 13C. FIG. 13A to FIG. 13C are explanatory diagrams illustrating details of control for operations of the mobile electronic device. In FIG. 13A and FIG. 13B, the y-axis represents an acceleration and timing of detection, and the x-axis represents time. In FIG. 13A and FIG. 13B, detection timing by each of the detectors is illustrated by a bar, and each acceleration detected by the acceleration sensor 36 at each time is illustrated by "cross" mark. In FIG. 13C, the y-axis represents a change amount of geomagnetism and a timing of detection thereof, and the x-axis represents time. In FIG. 13C, also, detection timing by each of the detectors is illustrated by a bar, and each change amount of geomagnetism at each time is illustrated by "cross" mark. Hereinafter, the case where the infrared sensor 42 is used as the detector will be explained.

As illustrated in FIG. 13A, for example, when a light flux emitted from the light emitting portion 34a of the projector 34 is $L_0$ [lm], the mobile electronic device 10 may activate the infrared sensor 42 and perform detection at an interval of once every 600 ms or each time 600 ms has passed when an acceleration value is $A_0$. The mobile electronic device 10 may activate the infrared sensor 42 and perform detection at an interval of once every 400 ms or each time 400 ms has passed when an acceleration value is $A_1$. The mobile electronic device 10 may activate the infrared sensor 42 and perform detection at an interval of once every 200 ms or each time 200 ms has passed when an acceleration value is $A_2$. The accelerations are $A_0<A_1<A_2$. As illustrated in FIG. 13B, when a light flux emitted from the light emitting portion 34a of the projector 34 is $L_1$ [lm] (where, $L_0>L_1$, or when weaker light is emitted), the mobile electronic device 10 may activate the infrared sensor 42 and perform detection at an interval of once every 800 ms or each time 800 ms has passed when an acceleration value is $A_0$ or an acceleration value is $A_1$. The mobile electronic device 10 may activate the infrared sensor 42 and perform detection at an interval of once every 400 ms or each time 400 ms has passed when an acceleration value is $A_2$.

In this way, if the acceleration value is larger, the number of detections (the number of detections per unit time) by the infrared sensor 42 is increased. In other words, by reducing the detection interval, when a larger acceleration is applied to the cabinet 11 or when a light emission direction is easily changed in an unexpected direction, the mobile electronic device 10 can quickly sense the necessity to stop the emission of light from the projector 34 or to reduce the amount of light emitted from the projector 34. That is, in the mobile electronic device 10, a detection interval by the infrared sensor 42 is set based on the acceleration, and this leads to a detection interval suitable for any possible situation. Here, the infrared sensor is used as an example to explain the detector, however, various types of sensors can be used as the detector, and can be applied to setting of the detection frequency by the proximity sensor and also to setting of the detection frequency of face recognition by the imaging unit.

The detection frequency by the infrared sensor 42 or the like may be more frequently performed when the light flux of the light emitted from the light emitting portion 34a is larger. That is, in the mobile electronic device 10, it is preferable to reduce the detection interval if the light flux of the light emitted from the light emitting portion 34a is larger. Thus, when light flux is larger, the mobile electronic device 10 can quickly sense the necessity to stop the emission of light from the projector 34 or to reduce the amount of light emitted from the projector 34.

Here, the accelerations $A_0<A_1<A_2$ can be arbitrarily set. For example, the acceleration value $A_0$ may be set as an acceleration value (1 G) in a stationary state, and the acceleration value $A_1$ may be set as an acceleration value (e.g., an acceleration value of natural hand vibration caused by the user holding the cabinet) detected when the user is holding the cabinet 11. When the acceleration value $A_1$ is set as an acceleration value detected while the user is holding the cabinet 11, the acceleration value $A_2$ becomes an acceleration value exceeding the acceleration value detected when the user is holding the cabinet 11. In the above explanation, it is assumed that the acceleration is detected as any one of $A_0$, $A_1$, and $A_2$. However, each of the values may be set as a given range, and thus if any acceleration other than the set values is detected, the values can be appropriately processed. The accelerations $A_0$, $A_1$, and $A_2$ may be set as thresholds, and thus the detection frequency is set based on whether an acceleration is equal to or more than the threshold, or less than that, or based on whether it is larger than the threshold, or equal to or less than that.

The mobile electronic device 10 may be configured to increase the number of detections by the infrared sensor 42 if the change amount of geomagnetism is larger. For example, as illustrated in FIG. 13C, when the change amount of geomagnetism detected by the geomagnetic sensor 50 is a threshold $B_0$ or less, the mobile electronic device 10 may activate the infrared sensor 42 and perform detection at an interval of once every 800 ms or each time 800 ms has passed. The mobile electronic device 10 may activate the infrared sensor 42 and perform detection at an interval of once every 400 ms or each time 400 ms has passed when the change amount of geomagnetism is more than the threshold $B_0$. In this way, by setting the detection interval based on the change amount of geomagnetism, when the change amount of geomagnetism is larger or when the direction of the cabinet largely changes, or when the light emission direction largely changes, the mobile electronic device 10 can quickly sense the necessity to stop the emission of light from the projector 34 or to reduce the amount of light emitted from the projector 34. This case is also explained using the infrared sensor as an example, however, this can be also applied to setting of the detection frequency by the proximity sensor and also to setting of the detection frequency of face recognition by the imaging unit.

When the user (person, living body) is touching the cabinet 11 or is pressing the cabinet 11, the number of detections by the infrared sensor 42 may be increased or the detection interval may be reduced as compared with the case where the user is not touching nor pressing the cabinet 11. This enables the mobile electronic device 10 to quickly sense the necessity to stop the emission of light from the projector 34 or to reduce the amount of light emitted from the projector 34 if the light emission direction easily changes in an unexpected direction because the user is touching the cabinet 11 or is pressing the cabinet 11. Here, the infrared sensor is used as an example to explain the detector, however, this can be also applied to the detection frequency by the proximity sensor and to the detection frequency of face recognition by the imaging unit. The case where the user touches the cabinet 11 or presses the cabinet 11 can be detected by detecting an input to the operation keys 13 of the operating unit. In this case, the operating unit for detecting the input to the operation keys 13 functions as a touch sensor. It goes without saying that any other touch sensor for detecting a change in capacitance on the surface of the cabinet 11 and detecting whether the cabinet is touched may be further mounted thereon, separately from the operating unit, so that a touch to the cabinet may be detected by the touch sensor.

The embodiments have been explained on the assumption that the mobile electronic device 10 is basically placed on a desk or a chair for use, except for the flowchart in FIG. 12, however, the projector 34 of the mobile electronic device 10 can be used while the operator holds it in hand. Therefore, as a mode to drive the projector 34, it is preferable to provide two modes: a mobile mode (first mode) which is assumed that the operator uses the projector 34 while holding the mobile electronic device 10 (cabinet 11) in hand and a stationary mode (second mode) which is assumed that the operator uses the projector 34 while the mobile electronic device 10 (cabinet 11) is placed on a desk, a table, or a charging base. Here, the control in FIG. 4 to FIG. 14 is simply used when the stationary mode is activated. In this way, the two modes are provided and switched to each other as required, which enables the operability and the safety to be further enhanced.

Figure 14:
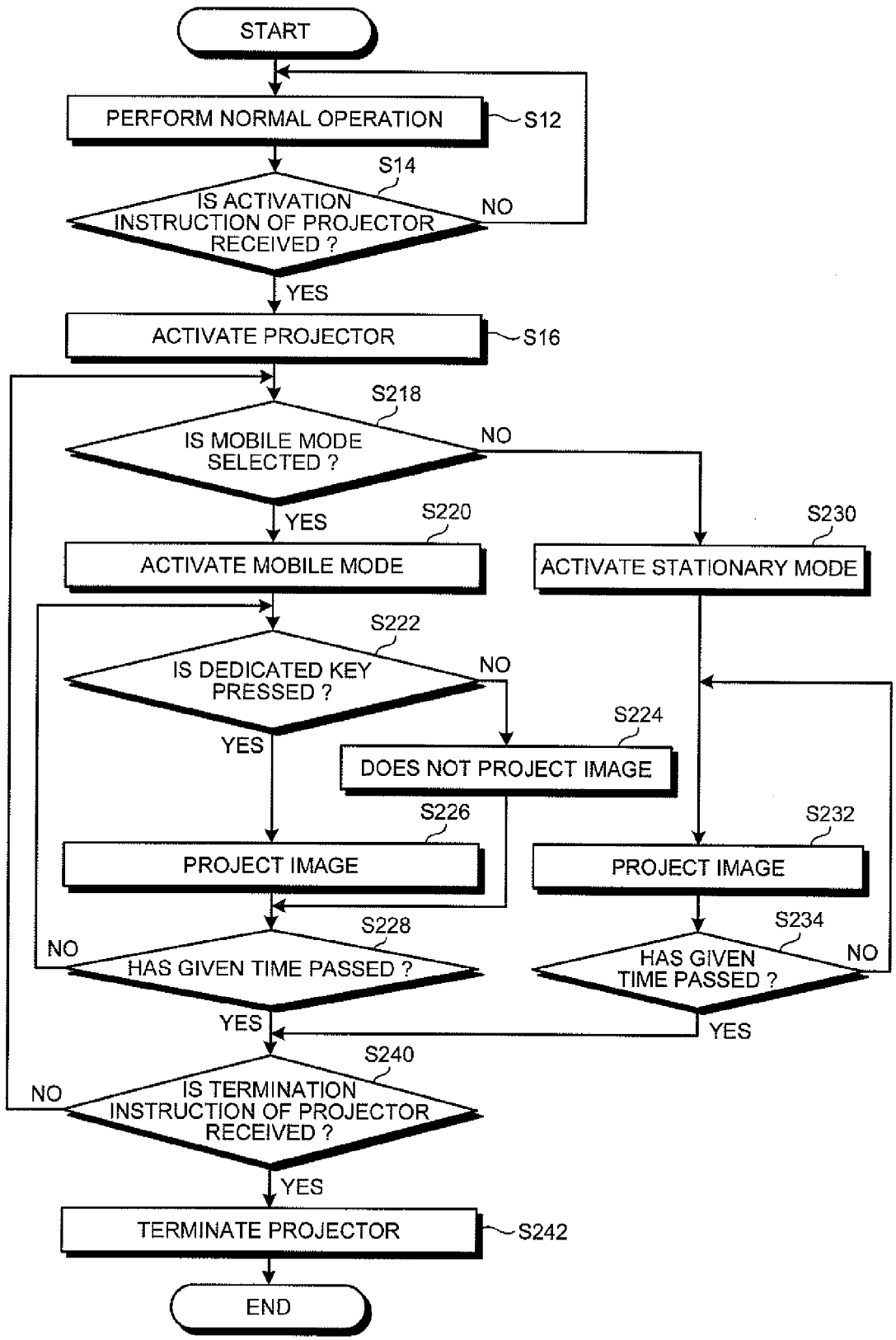
FIG. 14 is a flowchart illustrating one example of the operation of the mobile electronic device.

The operation control for switching between the two modes will be explained in detail below with reference to FIG. 14. FIG. 14 is a flowchart illustrating another example of the operation of the mobile electronic device. Here, because the flowchart illustrated in FIG. 14 has portions being the same operations as these of FIG. 4, detailed explanation of the overlapping portions is omitted, and operations specific to the flowchart illustrated in FIG. 14 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. Then, after activating the projector 34 at Step S16, the control unit 22 determines whether the mobile mode is selected as Step S218. Control methods of the mobile mode and the stationary mode will be explained below together with their operations. The mobile mode or the stationary mode according to the present embodiment is selected by the operator. As a timing in which the operator selects the mode, it may be selected at a step at which the control unit 22 proceeds to Step S218, or it may be selected as a previous setting when the normal operation is performed before activation of the projector.

When it is determined at Step S218 that the mobile mode is selected (Yes), then the control unit 22 activates the mobile mode as Step S220. After activating the mobile mode at Step S220, the control unit 22 determines whether the dedicated key 14 is pressed as Step S222. When it is determined at Step S222 that the dedicated key 14 is not pressed (No), the control unit 22 causes the projector 34 not to project the image as Step S224. That is, the control unit 22 causes the projector 34 not to emit the light. When it is determined at Step S222 that the dedicated key 14 is pressed (Yes), then the control unit 22 causes the projector 34 to project an image as Step S226. That is, the control unit 22 causes the projector 34 to emit the light.

After controlling whether the image is to be projected at Step S224 or Step S226, the control unit 22 determines whether a given time has passed, as Step S228. At Step S228, when it is determined that the given time has not passed (No), then the control unit 22 proceeds to Step S222. When it is determined that the given time has passed (Yes), then the control unit 22 proceeds to Step S240. In this manner, the control unit 22 repeats the operations from Step S222 to Step S228 until the given time has passed, and switches whether the image is to be projected depending on whether the dedicated key 14 is pressed.

When it is determined at Step S218 that the mobile mode is not selected (No), then the control unit 22 activates the stationary mode as Step S230. After activating the stationary mode at Step S230, the control unit 22 causes the projector 34 to project an image, as Step S232. Here, in the stationary mode, as explained in FIG. 4 to FIG. 14, the sensors are activated, and if it is detected that a target object is present within the given distance or a person's face is detected in the projection area, then irradiation of light from the projector 34 is stopped. As a specific example, the controls from Step S18 to Step S30 illustrated in FIG. 4 are performed. In this case, because Step S30 is equivalent to Step S240, actual operations are these right before Step S30. After causing the projector 34 to project an image at Step S232, the control unit 22 determines whether the given time has passed, as Step S234. At Step S234, when it is determined that the given time has not passed (No), then the control unit 22 proceeds to Step S232. When it is determined that the given time has passed (Yes), then the control unit 22 proceeds to Step S240. In this manner, the control unit 22 repeats the operations at Step S232 and Step S234 until the given time has passed, and continues to project the image from the projector 34.

When the given time has passed at Step S228 or at Step S234, then the control unit 22 determines whether an instruction to terminate the drive of the projector 34 or a termination instruction is received, as Step S240. When it is determined at Step S240 that the termination instruction of the projector is not received (No), then the control unit 22 proceeds to Step S218, again detects a selected mode, and controls the operation of the projector 34 based on the selected mode. That is, the control unit 22 repeats the operations until the drive of the projector 34 is stopped. When it is determined at Step S240 that the termination instruction of the projector is received (Yes), the control unit 22 terminates the drive of the projector 34 as Step S242, returns the operation to the normal operation, and ends the process. When the operation is returned to the normal operation, the control unit 22 determines again whether the activation instruction of the projector is received. That is, the control unit 22 repeats the operations in the flowchart illustrated in FIG. 14.

As explained above, in the flowchart illustrated in FIG. 14, the two modes, the mobile mode and the stationary mode, can be selected. When the mobile mode is selected, the mobile electronic device 10 causes the projector 34 to project an image only when the dedicated key 14 is pressed, while when the stationary mode is selected, the mobile electronic device 10 causes the projector 34 to project an image regardless of whether the dedicated key 14 is pressed.

In this way, when a projection position of an image or an irradiation position of light easily changes in such a case that the operator uses the mobile electronic device in hand, the mobile mode is selected and the image is projected only when the dedicated key 14 is pressed. This allows an instant stop of the image projection when a person cuts in the projection area of the image, that is, allows the light irradiation to be stopped. Especially, if the emitted light is irradiated to the person's face, the operator can stop the irradiation of the light only by releasing the dedicated key 14. This allows less possibility that the person is dazzled by the irradiated light. Even if the operator suddenly drops the mobile electronic device, the irradiation of the light is stopped. Therefore, when it is not known to which direction the light is irradiated, such as when it drops, the possibility of light irradiation can be reduced. This allows less possibility that the person is dazzled by the irradiated light.

In this manner, the operation controls can be switched to one another according to the use condition, and therefore even if the operator uses the mobile electronic device while holding it in hand, the operability is enhanced while the possibility that the person is irradiated with the light can be further reduced. In other words, the projector 34 can be used with high safety and high operability.

When the projection position of the image is not basically changed in such a case that the mobile electronic device 10 is used while being placed on a desk, a chair, or a table, the stationary mode is selected to project the image, and this enables the image to be projected in a state where the mobile electronic device 10 is placed thereon. In this case also, as explained above, by providing the controls as illustrated in FIG. 4 to FIG. 14, the possibility that the light emitted from the projector 34 may enter the person's eyes can be reduced, thus enhancing the operability and the safety.

Here, the dedicated key 14 is provided on the side face of the cabinet 11 in the present embodiment, however, the position of the dedicated key 14 is not particularly limited, so that the dedicated key 14 may be provided on the face where the operation keys 13 are provided or may be provided on the bottom face of the cabinet 11. In the embodiment, when the mobile mode is selected, it is configured to project the image only when the dedicated key 14 is pressed, however, the present invention is not limited thereto. Therefore, any key may be used as a key to determine whether the image is to be projected. For example, when a particular key among the operation keys 13 is pressed, the image may be projected, or if any one of the operation keys 13 is pressed, the image may be projected irrespective of any type of keys. In addition, when a touch panel is used instead of the keys, the image may be projected while the operator touches the touch panel.

In the embodiment, it is configured that the operator selects whether the mobile mode is set or the stationary mode is set, however, the present invention is not limited thereto. Therefore, it may be configured that the mobile electronic device 10 detects its conditions and automatically select one of the modes.

For example, the acceleration sensor 36 detects an acceleration acting on the cabinet 11, so that the mode may be selected (switched) based on the detected acceleration. As one example, when the acceleration is not detected or when it can be determined as substantially zero, the control unit 22 sets the stationary mode, and if any case other than this case, the control unit 22 may set the mobile mode. When an acceleration of a given value or more is detected, the control unit 22 may set the mobile mode. In this manner, by switching one mode to the other based on the acceleration, an appropriate control mode can be set without any operation performed by the operator, which enables the operability to be further enhanced while maintaining safety. By setting so as to automatically switch between the modes, it is possible to prevent that the stationary mode is selected despite that the operator is holding the mobile electronic device 10.

Moreover, the control unit 22 detects a frequency of force and a magnitude of the force (amplitude) from the acceleration acting on the cabinet 11, and may simply select the mobile mode when the detected values are numerical values which can be determined as natural hand vibration. Specifically, in the flowchart illustrated in FIG. 12, when the control unit 22 proceeds to Step S114, the mode is determined as the mobile mode, while the control unit 22 proceeds to Step S30 and to Step S118, the mode may be determined as the stationary mode. In this manner, by determining whether the operator is holding the cabinet based on the natural hand vibration, and this allows discrimination between shaking caused by the operator holding it and any other shaking (e.g., shaking caused by an object hitting a desk), thus further enhancing the operability.

Selection is not limited to the selection between the mobile mode and the stationary mode based on the acceleration detected by the acceleration sensor 36. Therefore, it may be detected whether the mobile electronic device 10 is connected to an external power supply (e.g., AD adaptor) used for charging, and a mode may be selected based on the detected result. As a detector that detects whether the power supply and the mobile electronic device 10 are connected to each other, a detection sensor that detects whether a connection terminal of the mobile electronic device 10 is connected with the power supply and a detection sensor that detects power, voltage and/or current supplied externally to the mobile electronic device 10 can be used.

In the case where the mode is switched to the other based on whether the mobile electronic device 10 is connected to the power supply as above, it can be set so that when it is detected that the mobile electronic device 10 is connected to the power supply, the stationary mode is selected, while when it is not detected that the mobile electronic device 10 is connected to the power supply or when it is detected that the mobile electronic device 10 is not connected to the power supply, then the mobile mode is selected. Consequently, when the mobile electronic device 10 is connected to the power supply (power supply cord) and its movement is restricted, the mode is switched to the stationary mode, while when the movement is not restricted, then the mode is switched to the mobile mode, thus enhancing the safety and the operability.

When the power is to be detected, it is preferably identified whether the power is supplied from a commercial power supply such as a provided outlet or is supplied from a dry-cell battery or from a battery of PC and the like connected thereto through USB, based on supplied power, voltage and/or current. In the case where the power can be identified in this manner, it is preferable to select the stationary mode in the case where the power is supplied from the commercial power supply. This can change the mode to be selected depending on whether it is connected to a freely movable power supply such as a dry-cell battery or it is connected to a commercial power supply in which a movement range is restricted by the cord, thus further enhancing the safety and the operability. When the mobile electronic device 10 is to be charged, it is detected whether the mobile electronic device 10 is placed on a charging base, and the mode may be selected based on the result of detection. Here, as a detector that detects whether the mobile electronic device 10 is placed on the charging base, a contact detection sensor is simply provided at a contact position of the cabinet 11 with the charging base.

In this way, based on whether the mobile electronic device 10 is placed on the charging base, when the modes are switched to each other, it can be set so as to select the stationary mode if it is detected that the mobile electronic device 10 is placed on the charging base, and to select the mobile mode if it is not detected that the mobile electronic device 10 is placed on the charging base or it is detected that the mobile electronic device 10 is not placed on the charging base. Thus, when the mobile electronic device 10 is placed on the charging base and its movement is restricted, then the mode can be determined as the stationary mode, while its movement is not restricted, then the mode can be determined as the mobile mode, which allows enhancement of the safety and the operability.

Moreover, the present invention is not limited to the case where the mode is determined according to the status of the mobile electronic device 10 or according to whether the mobile electronic device 10 is connected to the power supply, or according to whether it is placed on the charging base.

FIGS. 15A to 15D are explanatory diagrams of one example of controls in the mobile electronic device, or explanatory diagrams illustrating operation patterns. First, the operation pattern as illustrated in FIG. 15A is an operation pattern in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, the stationary mode cannot be selected but the mobile mode can be selected. In other words, the operation pattern as illustrated in FIG. 15A is the one in which one mode is selected according to the status of the mobile electronic device 10.

The operation pattern illustrated in FIG. 15B is the one in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, both the stationary mode and the mobile mode can be selected. In case of this operation pattern, when the mobile electronic device 10 is not placed on the charging base and is not connected to the power supply, the operator can select whether to set the stationary mode or to the mobile mode.

The operation pattern illustrated in FIG. 15C is the one in which when the mobile electronic device 10 is placed on the charging base and/or is connected to the power supply, both the stationary mode and the mobile mode can be selected, while when the mobile electronic device 10 is not placed on the charging base and is not connected to the power supply, the stationary mode cannot be selected but the mobile mode can be selected. In the case of this operation pattern, when the mobile electronic device 10 is placed on the charging base and/or is connected to the power supply, the operator can select whether to set the stationary mode or to set the mobile mode.

The operation pattern illustrated in FIG. 15D is the one in which in both the cases where the mobile electronic device 10 is placed on the charging base and/or is connected to the power supply and where the mobile electronic device 10 is not placed on the charging base and is not connected to the power supply, both the stationary mode and the mobile mode can be selected. In the case of this operation pattern, the operator can select whether to set the stationary mode or to set the mobile mode in both of the cases.

In this way, as any one of the four operation patterns as illustrated in FIG. 15A to FIG. 15D, two modes can be selected, thus enhancing the safety and the operability. Moreover, the operator may set one operation pattern of the four operation patterns, or may store only one operation pattern of the four operation patterns as an application program in the mobile electronic device 10.

In the embodiment, the acceleration sensor 36 is provided in the mobile electronic device 10. However, when the detection result of the acceleration is not used at the time of selecting the mobile mode or the stationary mode, the acceleration sensor 36 is not necessarily provided. For example, when the mode is selected only through the selection operation by the operator, there is no need to provide the acceleration sensor.

Industrial Applicability

As explained above, the mobile electronic device according to the present invention is suitable for projecting an image in a state in which high safety is ensured.

The invention claimed is:

1. A mobile electronic device, comprising:
an acceleration sensor that detects an acceleration acting on the mobile electronic device;
an image projector that projects an image;
a detector that detects a specific change in an irradiation area of light irradiated from the image projector or in a predetermined area including the irradiation area; and
a control unit that controls an operation of the image projector, wherein
when the detector detects the specific change, the control unit causes the image projector to stop emission of light therefrom or to reduce an amount of light emitted therefrom, and
the control unit increases the number of detections by the detector per unit time as the acceleration detected by the acceleration sensor increases,
wherein the detector includes a proximity sensor that measures a distance between an object in the irradiation area or in the predetermined area including the irradiation area and a light emission position of the image projector,
wherein the detector detects a change in the distance to the object measured by the proximity sensor as the specific change, and
wherein the detector detects that a change rate of the distance between the object in the irradiation area or in the predetermined area including the irradiation area detected by the proximity sensor and the light emission position of the image projector is a given value or more, as the specific change.

2. The mobile electronic device according to claim 1, wherein the proximity sensor includes a light-emitting element and a light-receiving element, and measures a distance to the object in such a manner that light emitted from the light-emitting element and reflected by the object is received by the light-receiving element.

3. The mobile electronic device according to claim 1, wherein the proximity sensor includes a light-receiving element, and measures a distance to the object in such a manner that light irradiated from the image projector and reflected by the object is received by the light-receiving element.

4. The mobile electronic device according to claim 1, wherein when a first acceleration value is detected by the acceleration sensor, the control unit sets the number of detections per unit time by the detector to a larger number as compared with a case where a second acceleration value being an acceleration value smaller than the first acceleration value is detected.

5. The mobile electronic device according to claim 4, wherein the first acceleration value is a detected value of acceleration caused by natural hand vibration when a user holds the mobile electronic device, and
the second acceleration value is an acceleration value detected in a stationary state of the mobile electronic device.

6. The mobile electronic device according to claim 4, wherein the second acceleration value is a detected value of acceleration caused by natural hand vibration when a user holds the mobile electronic device, and
the first acceleration value is an acceleration value exceeding the second acceleration value.

7. A mobile electronic device, comprising:
a geomagnetic sensor that detects a change amount of geomagnetism;
an image protector that projects an image;
a detector that detects a specific change in an irradiation area of light irradiated from the image projector or in a predetermined area including the irradiation area; and
a control unit that controls an operation of the image projector, wherein
when the detector detects the specific change, the control unit causes the image projector to stop emission of the light therefrom or to reduce an amount of the light emitted therefrom, and
when a first change amount is detected by the geomagnetic sensor, the control unit sets the number of detections per unit time by the detector to a larger number as compared with a case where a second change amount being a change amount of geomagnetism smaller than the first change amount is detected.

8. A mobile electronic device, comprising:
a touch sensor that detects that a user touches or presses a surface of the mobile electronic device;
an image projector that projects an image;
a detector that detects a specific change in an irradiation area of light irradiated from the image projector or in a predetermined area including the irradiation area;
a control unit that controls an operation of the image projector, wherein
when the detector detects the specific change, the control unit causes the image projector to stop emission of the light therefrom or to reduce an amount of the light emitted therefrom, and
when the touch sensor detects that the user touches or presses the surface, the control unit sets the number of detections per unit time by the detector to a larger number as compared with a case where the touch or pressing is not detected.

9. A mobile electronic device, comprising:
an image projector that projects an image;
a specific sound detector that detects a specific change in an irradiation area of light irradiated from the image projector or in a predetermined area including the irradiation area by detecting a specific sound emitted from a human; and
a control unit that controls an operation of the image projector, wherein
when the detector detects the specific change, the control unit causes the image projector to stop emission of the light therefrom or to reduce an amount of the light emitted therefrom,
wherein a frequency of the specific sound ranges from 500 Hz to 2 kHz.

10. The mobile electronic device according to claim 9, wherein the frequency of the specific sound ranges from 500 Hz to 1 kHz.

11. The mobile electronic device according to claim 9, wherein the frequency of the specific sound ranges from 1 kHz to 2 kHz.

* * * * *